(12) United States Patent
Lo

(10) Patent No.: US 8,342,426 B2
(45) Date of Patent: Jan. 1, 2013

(54) METHOD FOR ADJUSTING TELESCOPIC WATER PIPE AND STRUCTURE THEREOF

(75) Inventor: Shun-Nan Lo, Taichung (TW)

(73) Assignee: Yuan-Mei Corp., Taichung (TW)

( * ) Notice: Subject to any disclaimer, the term of this patent is extended or adjusted under 35 U.S.C. 154(b) by 445 days.

(21) Appl. No.: 12/591,958

(22) Filed: Dec. 7, 2009

(65) Prior Publication Data

US 2010/0320288 A1 Dec. 23, 2010

(30) Foreign Application Priority Data

Jun. 4, 2009 (WO) ................ PCT/CN2009/072125
Jul. 3, 2009 (TW) ............................... 98122677 A

(51) Int. Cl.
*B05B 15/06* (2006.01)
*B05B 15/10* (2006.01)
*F16K 11/074* (2006.01)

(52) U.S. Cl. ........ 239/281; 239/204; 239/203; 239/532; 137/625.46; 137/876

(58) Field of Classification Search .................. 239/203, 239/204, 280, 280.5, 532; 138/111–117; 251/207, 208, 292, 304, 309–311, 345, 352; 137/625.47, 625.46, 876

See application file for complete search history.

(56) References Cited

U.S. PATENT DOCUMENTS

| 2,337,321 A | * | 12/1943 | Freeman | .................. 137/625.47 |
| 4,272,023 A | * | 6/1981 | Georgiev et al. | .............. 239/204 |
| 4,540,144 A | * | 9/1985 | Perrella | ..................... 244/135 A |
| 4,749,127 A | * | 6/1988 | Ash | .............................. 239/14.2 |
| 4,886,212 A | * | 12/1989 | Proctor et al. | ................ 239/315 |

* cited by examiner

*Primary Examiner* — Len Tran
*Assistant Examiner* — Justin Jonaitis
(74) *Attorney, Agent, or Firm* — Raymond Y. Chan; David and Raymond Patent Firm

(57) ABSTRACT

A method for adjusting telescopic water pipe and its structure comprise assembling an internal pipe and an external pipe to form a first water passage and a second external water passage, and an independent second internal water passage. A water passage control switch is disposed to an end of the external pipe and has a channel seal cap that divided into a first channel and a first through hole to connect the first water passage. A water stop plug ring is fit to the first through hole. A second and third through holes corresponding to a second and third channels can be connected to the second internal water passage. A rotary switch is connected to the channel seal cap. A penetration hole is disposed to a partition attached to the channel seal cap. An interconnection groove and an arc plane are disposed to the partition.

15 Claims, 25 Drawing Sheets

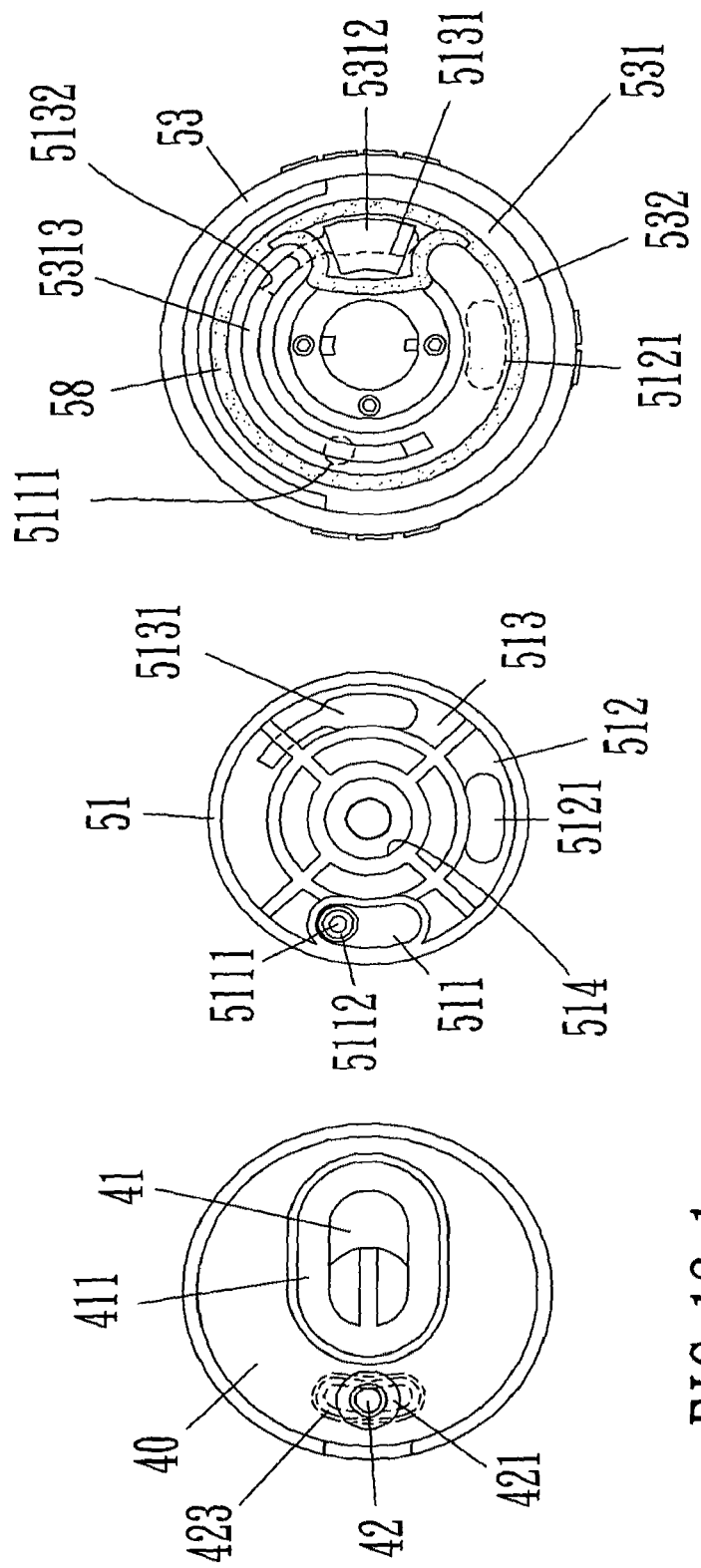

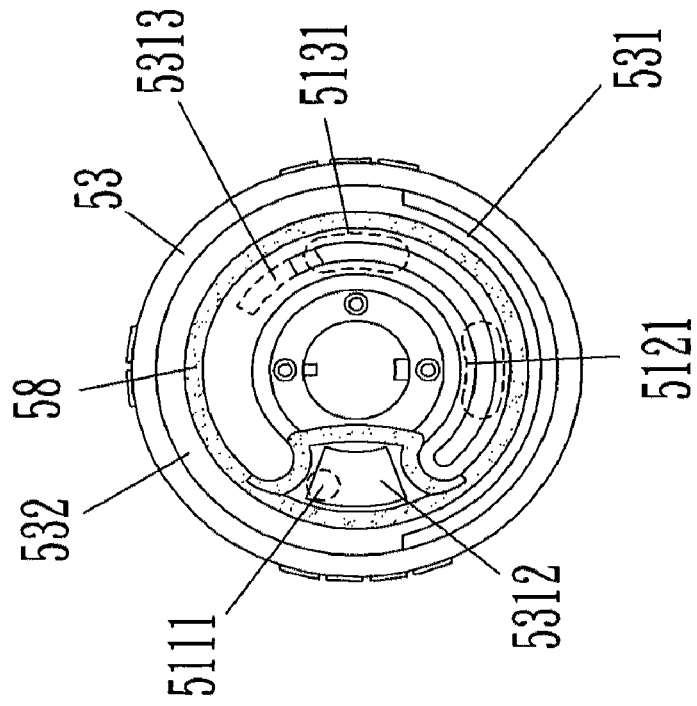
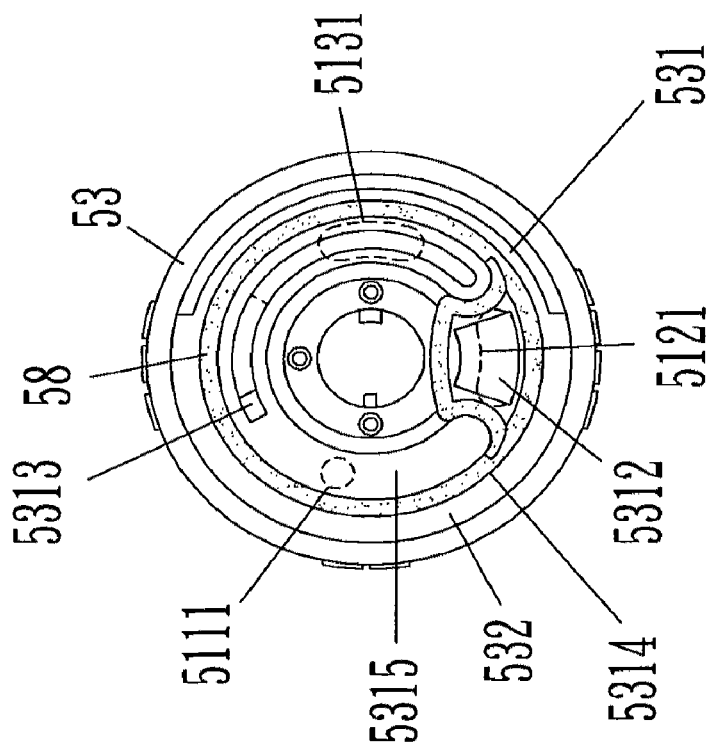

METHOD FOR ADJUSTING TELESCOPIC WATER PIPE AND STRUCTURE THEREOF

FIELD OF THE INVENTION

The present invention relates to a telescopic water pipe applied to agriculture, cleaning and horticulture, and more particularly to a method of adjusting the telescopic water pipe and its structure that design a plurality of independent water passages between an internal pipe and an external pipe fit to each other so that the internal pipe and the external pipe use water pressure as a power source to automatically retract or stretch the lengths of the internal pipe and the external pipe, or perform stepless-type expansion positioning by introducing and controlling water flow into different water passages.

BACKGROUND OF THE INVENTION

A conventional telescopic water pipe structure associated with the present invention still utilizes multiple pipe bodies of which its pipe diameters are increased or shrunk gradually to incorporate with mutual fitting to achieve the goal of preventing water leakage between two pipe bodies by disposing a water stop ring between adjacent pipe bodies.

The conventional technique is applied to garden spraying devices, including Taiwan granted patent No. M329134, entitled as "Flexible tube and water sprayer with the same" and No. 393884, entitled as "Structural improvement of telescopic tube of telescopic sprinkler", or cleaning devices, including No. 347042, entitled as "Leak stoppage structure for expanding water-spraying pipe", No. 357604, entitled as "Improvement of retractable rod for cleaner", No. 576177, entitled as "Improved telescopic cleaning rod", and No. 582269, entitled as "Improved structure of telescopic cleaning rod".

However, the foregoing conventional structures have drawbacks as the following:
1. When the length of the telescopic pipe body is stretched out, water pressure or manual force is utilized to support the stretching. Lastly, two pipe bodies or multiple pipe bodies are pressed and stored by depending upon two hands to achieve the goal of retracting the bodies while performing the storing.
2. When the length of a portion of the conventional telescopic pipe bodies is adjusted, it does not have the function of randomly positioning the length.
3. Another portion of the conventional structures may have the function of randomly positioning the length while adjusting the length of another portion of the telescopic pipe bodies. However, the function must be achieved by installing an eccentric positioning means. Consequently, the device cost is increased and the positioning manner still adapts the common usual technique without any innovation.

Accordingly, to overcome the foregoing shortcomings, the inventor(s) of the present invention based on years of experience in the related field to conduct extensive researches and experiments for the telescopic water pipe structure, and finally invented a method for adjusting telescopic water pipe and its structure.

SUMMARY OF THE INVENTION

A primary objective of the invention is to provide a method of adjusting a telescopic water pipe and its structure that automatically control stretching or retracting lengths of water pipes by completely utilizing water pressure.

Another objective of the invention is to allow the telescopic water pipe to have the function of stepless-type length positioning by means of water pressure control.

To achieve the foregoing objectives, a method of adjusting a telescopic water pipe and its structure provided by the invention are two section type long pipe bodies and comprise an internal pipe and an external pipe fit to each other. An end of the internal pipe can be connected to a spray nozzle. Another end of the internal pipe fit to a terminal portion of the external pipe is fastened with an internal plug pipe. An external portion of the internal plug pipe has an internal plug water stop ring. An external portion of the internal plug water stop ring can be closely attached to an internal wall of a pipe hole of the external pipe to form a second external water passage between an external wall of the internal pipe and the pipe hole of the external pipe. A second internal water passage is further formed between a pipe hole of the internal pipe and the pipe hole of the external pipe. An independent first water passage having equivalent length is further formed at a side of the external pipe. A fitting end of the external pipe for fitting the internal pipe is fastened with an upper seal cap capable of communicating with the first water passage, and furthermore an internal pipe water stop ring is disposed between the upper seal cap and the internal pipe. Another end of the external pipe is fastened to a lower seal cap. The lower seal cap has an accommodating chamber. An upper portion of the accommodating chamber has two independent water passages that are a main water passage for communicating with the external pipe, and a secondary water passage for communicating with the first water passage. A water passage control switch includes a channel seal cap that is assembled to the inside of the lower seal cap and that are divided into a first channel, a second channel and a third channel having upward openings. The first channel is communicating with the secondary water passage and a bottom of the first channel has a first through hole and a water stop ring. The second channel and the third channel respectively communicate with the main water passage. A second through hole is disposed to a bottom of the second channel and a third through hole is disposed to a bottom of the third channel. A side of the second through hole has an extension groove. A rotary switch is assembled to a lower portion of the channel seal cap. A partition is horizontally disposed to the inside of the rotary switch. A periphery of the partition has a penetration hole for communicating with the upper accommodating chamber and the lower accommodating chamber. In addition, an interconnection groove, a limit recess and an arc plane are disposed to an upper end of the partition. The limit recess is fit with a water stop ring for surrounding circumferences of the interconnection groove and the penetration hole so that the water stop ring and the partition can be attached to the bottom surface of the channel seal cap. Accordingly, the adjustment method is that:

After the penetration hole of the rotary switch is adjusted to align the first through hole of the first channel of the channel seal cap, water flow is finally introduced into the second external water passage from the secondary water passage by passing through the first water passage. The internal plug pipe integrally fastened with the internal pipe then is pushed by the water pressure force to move from the top to the bottom. The internal pipe is gradually stored in the external pipe to achieve the function of automatically retracting the length of the telescopic water pipe.

After the penetration hole of the rotary switch is adjusted to align the second through hole of the second channel of the channel seal cap, a bottom of the water stop ring fit to the first through hole of the first channel is exactly and closely attached to the arc plane to form a complete sealing state.

Therefore, water originally stayed in the first water passage is unable to be drained away to form a dead storage. The stretching and retracting lengths of the internal pipe and the external pipe are retained at the present state. On the other hand, water flow passes through the second channel from the main water passage and is drained by the second internal water passage composed of cascading the internal pipe and the external pipe.

After the penetration hole of the rotary switch is adjusted to align the third through hole of the third channel of the channel seal cap, the interconnection groove is exactly located between the first through hole of the first channel and the extension groove of the third channel to form a cascade state. Therefore, water originally stayed in the first water passage is introduced into the third channel through the extension groove by utilizing the interconnection groove. Since the bore diameter of the interconnection groove is smaller than the penetration hole, the inside of the second internal water passage can obtain greater water flow. Moreover, when the water pressure of the second internal water passage is greater than the water pressure of the first water passage and the outflow pressure is smaller than the inflow pressure through the internal pipe connected to the water spray nozzle, the internal pipe is slowly pushed toward the outside by using the water pressure of the second internal water passage to achieve the function of stretching the length of the telescopic water pipe.

BRIEF DESCRIPTION OF THE DRAWINGS

FIG. 6-1 is a top view drawing illustrating the rotary switch according to FIG. 6;

FIG. 10-1 is a local enlarged drawing according to FIG. 10;

FIG. 12-1 is a top-view drawing illustrating a seal cap of relative position according to FIG. 1;

FIG. 12-2 is a top-view drawing illustrating a channel seal cap of relative position according to FIG. 1;

FIG. 12-3 is a top-view drawing illustrating a rotary switch of relative position according to FIG. 1;

FIG. 12-4 is a top-view drawing illustrating a rotary switch rotating 90 degrees based upon a clockwise direction according to FIG. 1;

FIG. 12-5 is a top-view drawing illustrating a rotary switch rotating 180 degrees based upon a clockwise direction according to FIG. 1;

FIG. 22-1 is a top view drawing illustrating a rotary switch combined to a water stop ring according to an assembly embodiment of FIG. 22;

FIG. 22-2 is a top view drawing illustrating a rotary switch rotating 90 degrees based upon a clockwise direction according to FIG. 22;

FIG. 22-3 is a top view drawing illustrating a rotary switch rotating 180 degrees based upon a clockwise direction according to FIG. 22;

DETAILED DESCRIPTION OF THE PREFERRED EMBODIMENTS

Other features and advantages of the present invention will become apparent from the following description of the invention which refers to the accompanying drawings.

Figure 1:
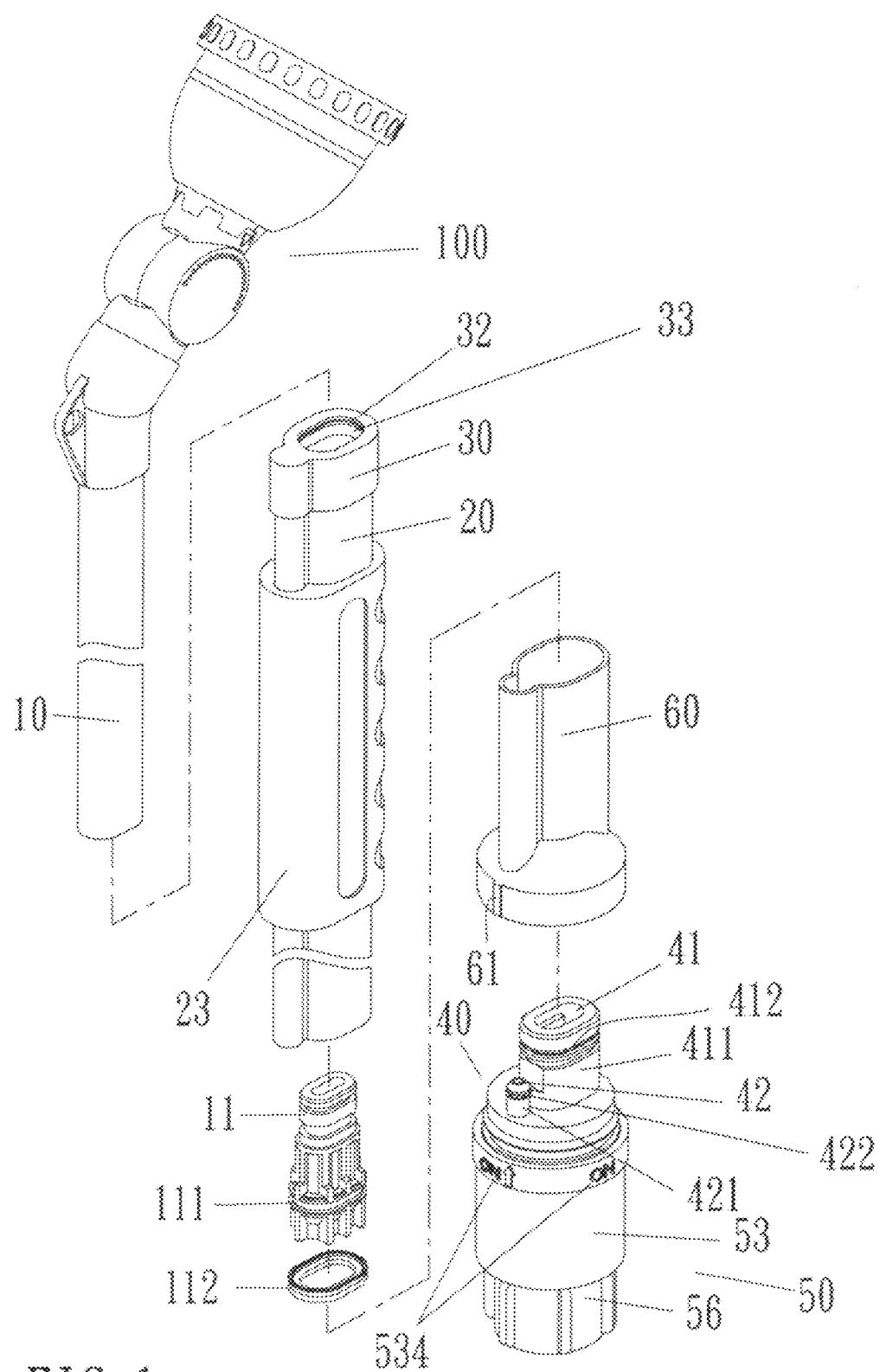
FIG. 1 is a decomposition drawing illustrating a structure according to a preferred embodiment of the present invention.
Figure 9:
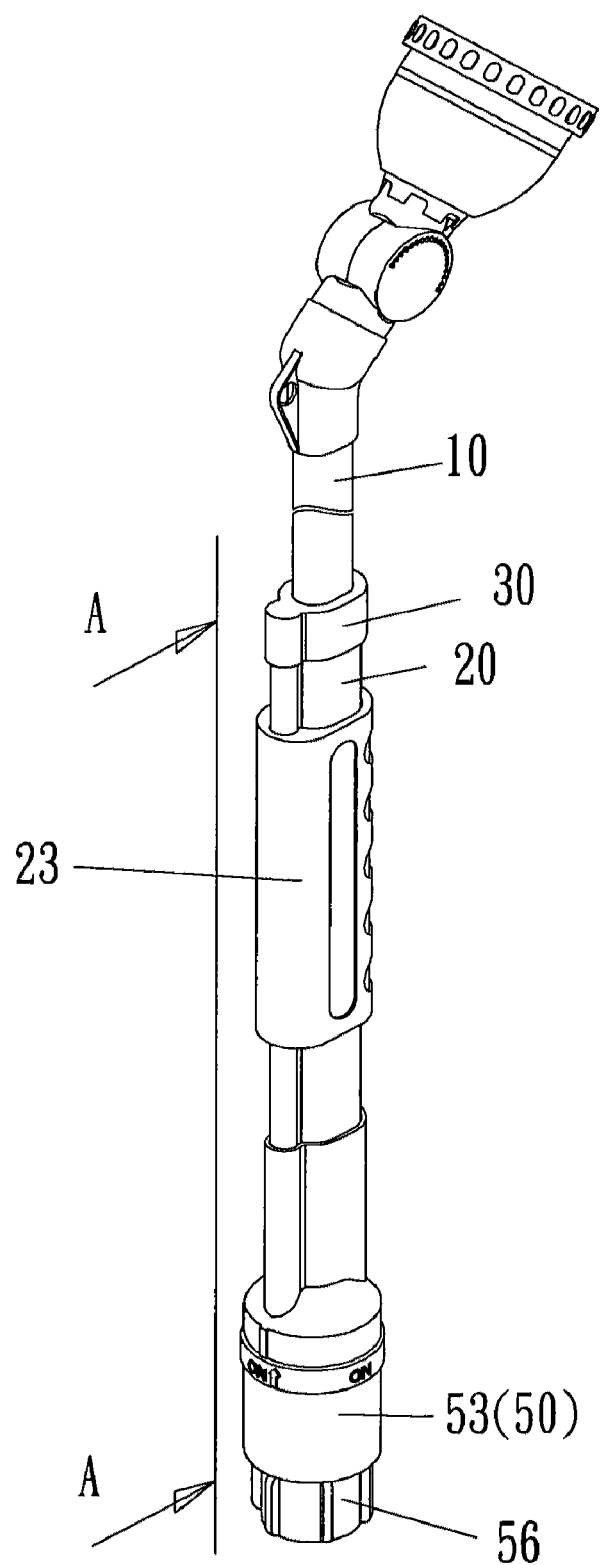
FIG. 9 is an assembly drawing illustrating the structure according to a preferred embodiment of the present invention.
Figure 10:
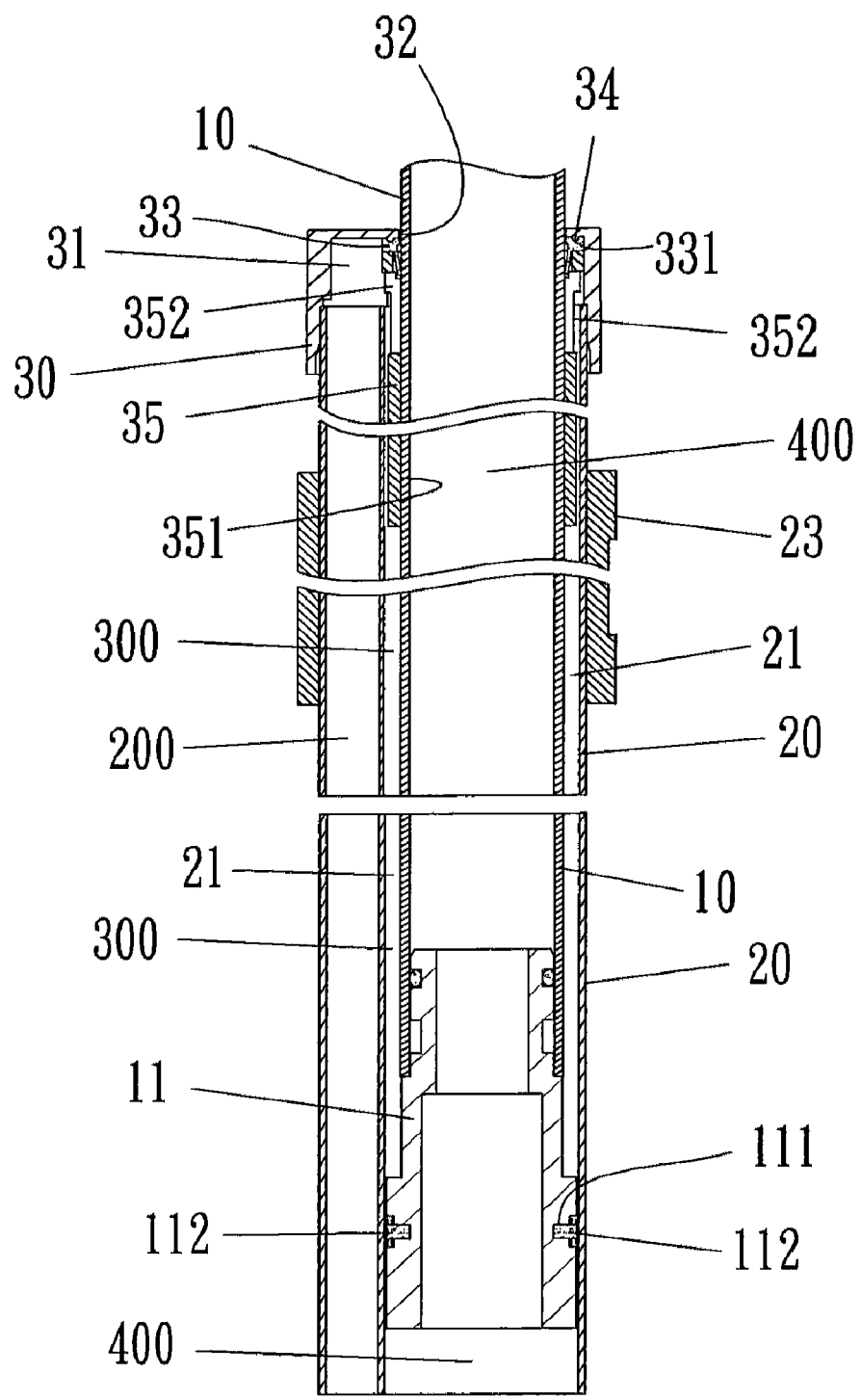
FIG. 10 is a cross-sectional drawing illustrating an upper section portion of A-A shown in FIG. 9
Figures 1, 10:
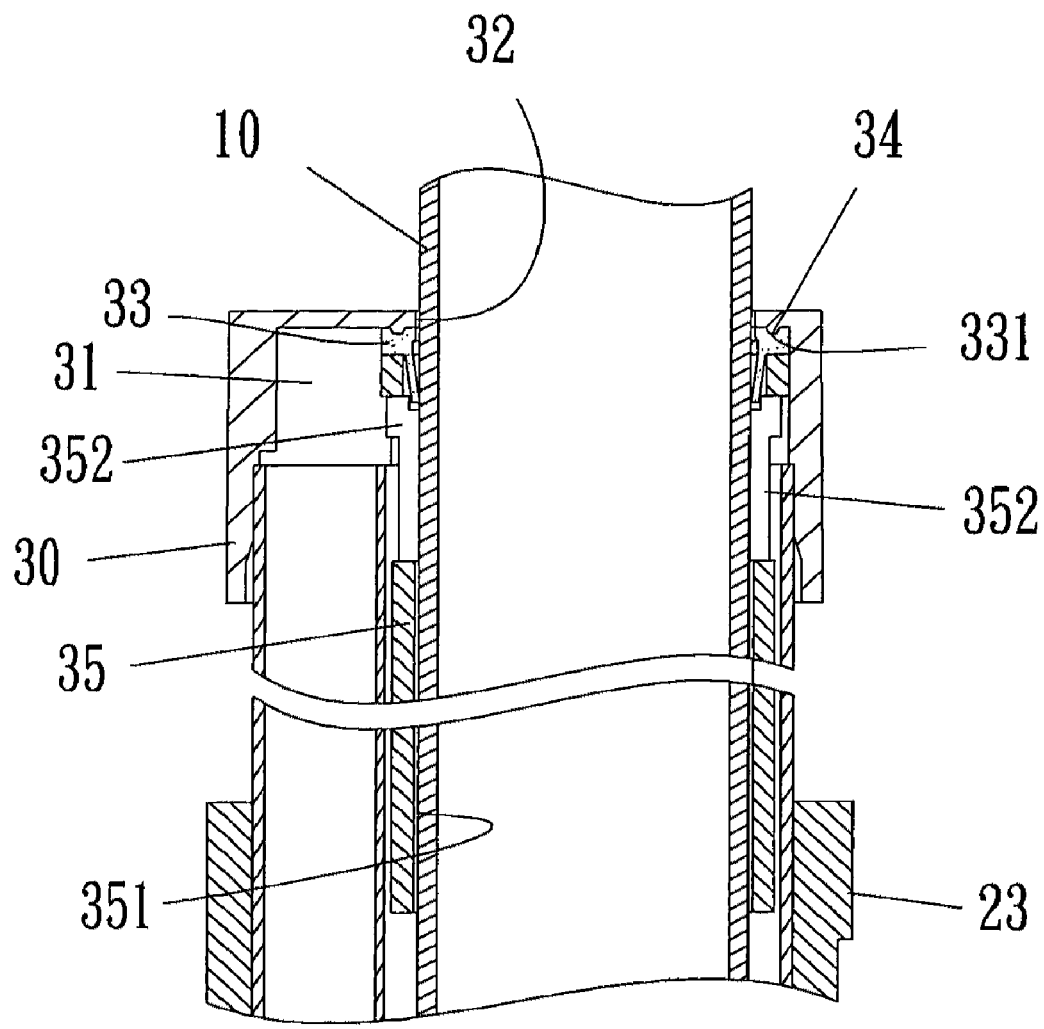

First, please refer to FIG. 1, FIG. 9, FIG. 10 and FIG. 10-1, a decomposition drawing of a method for adjusting telescopic water pipe and its structure is shown according to a preferred embodiment of the invention. The method includes utilizing an internal pipe 10 and an external pipe 20 with two-stage fitting manner to form a long pipe body. The inside of the long pipe body has a first water passage 200, a second external water passage 300 and a second internal water passage 400. The first water passage 200 and the second external water passage 300 use an upper seal cap 30 for communicating to each other. After water flow is introduced into the first water passage 200, water flow then enters into the second external water passage 300 through the upper seal cap 30 to push the internal pipe 10 to form a retraction state. After water flow is introduced into the second internal water passage 400, the internal pipe 10 is stretched out to form an extending state due to the water pressure of the outflow end of the internal pipe 10 that is smaller than the inflow pressure.

Figure 11:
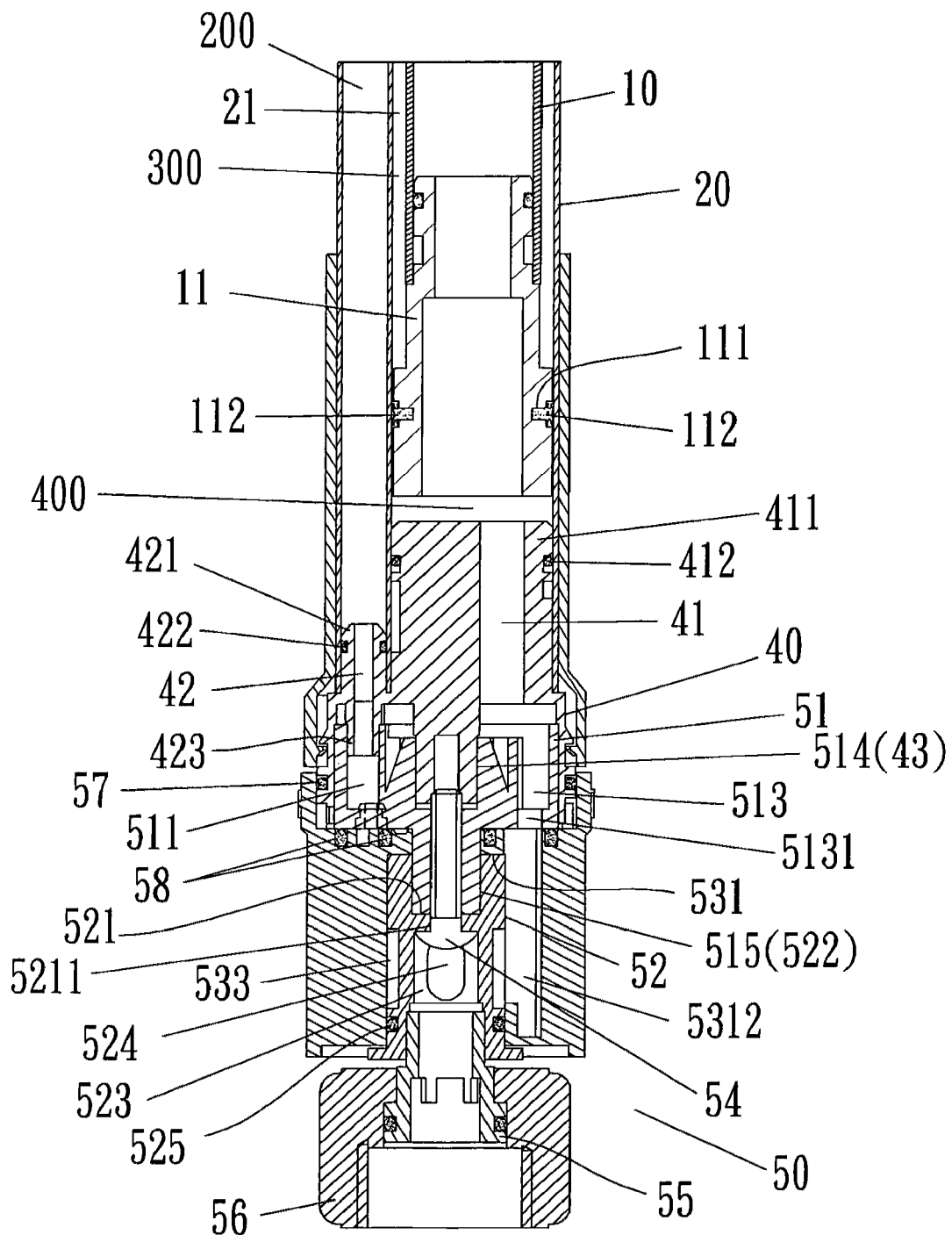
FIG. 11 is a cross-sectional drawing illustrating a lower section portion of A-A shown in FIG. 9.
Figure 13:
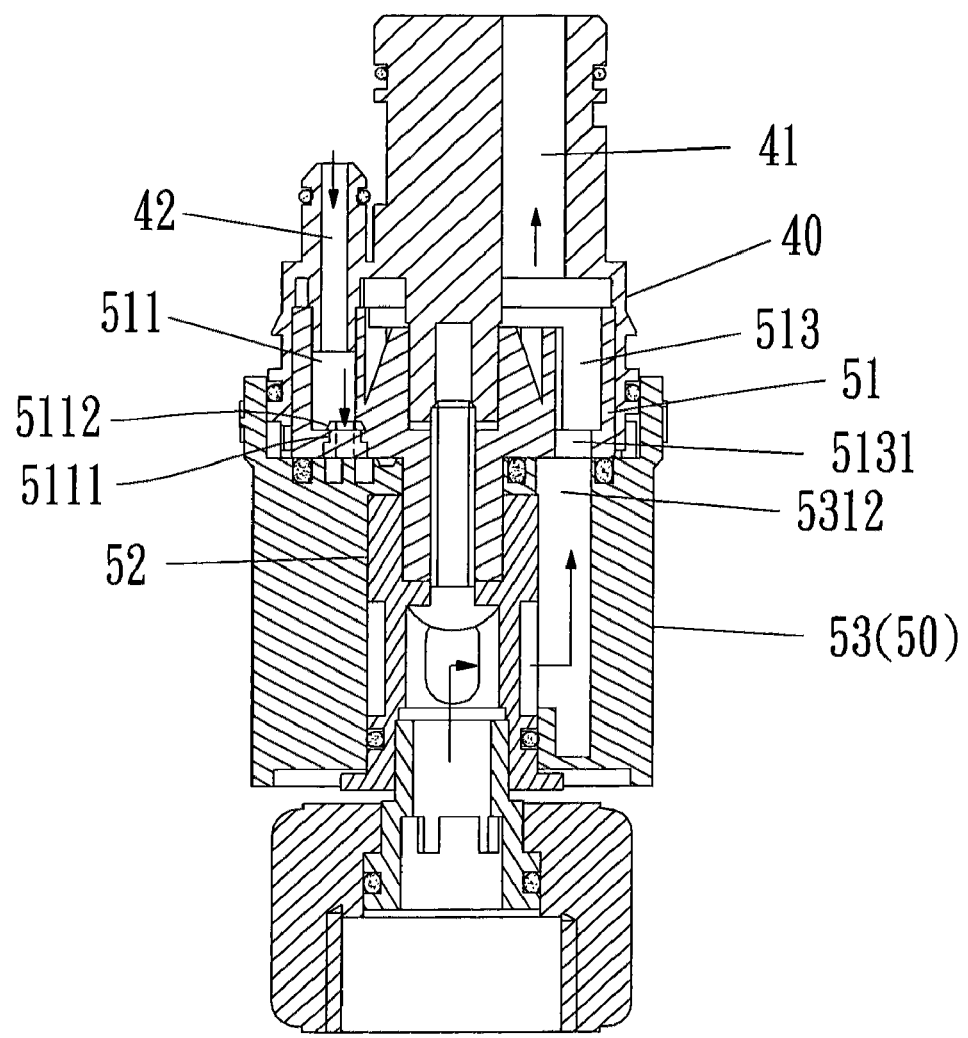
FIG. 13 is a cross-sectional drawing of an assembled front view according to FIG. 3.
Figure 14:
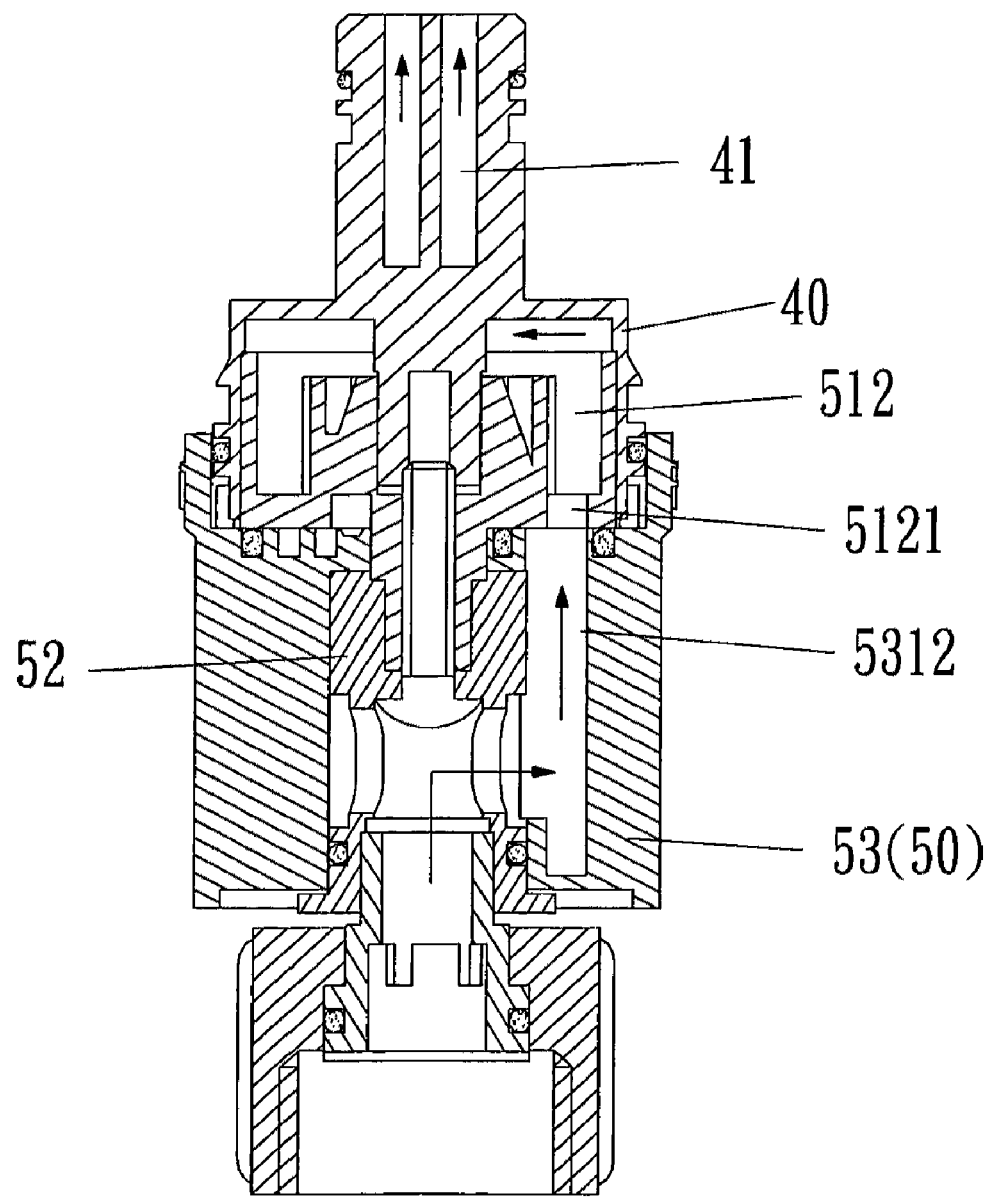
FIG. 14 is a cross-sectional drawing of an assembled side view illustrating a rotary switch rotating 90 degrees based upon a clockwise direction according to FIG. 3.
Figure 15:
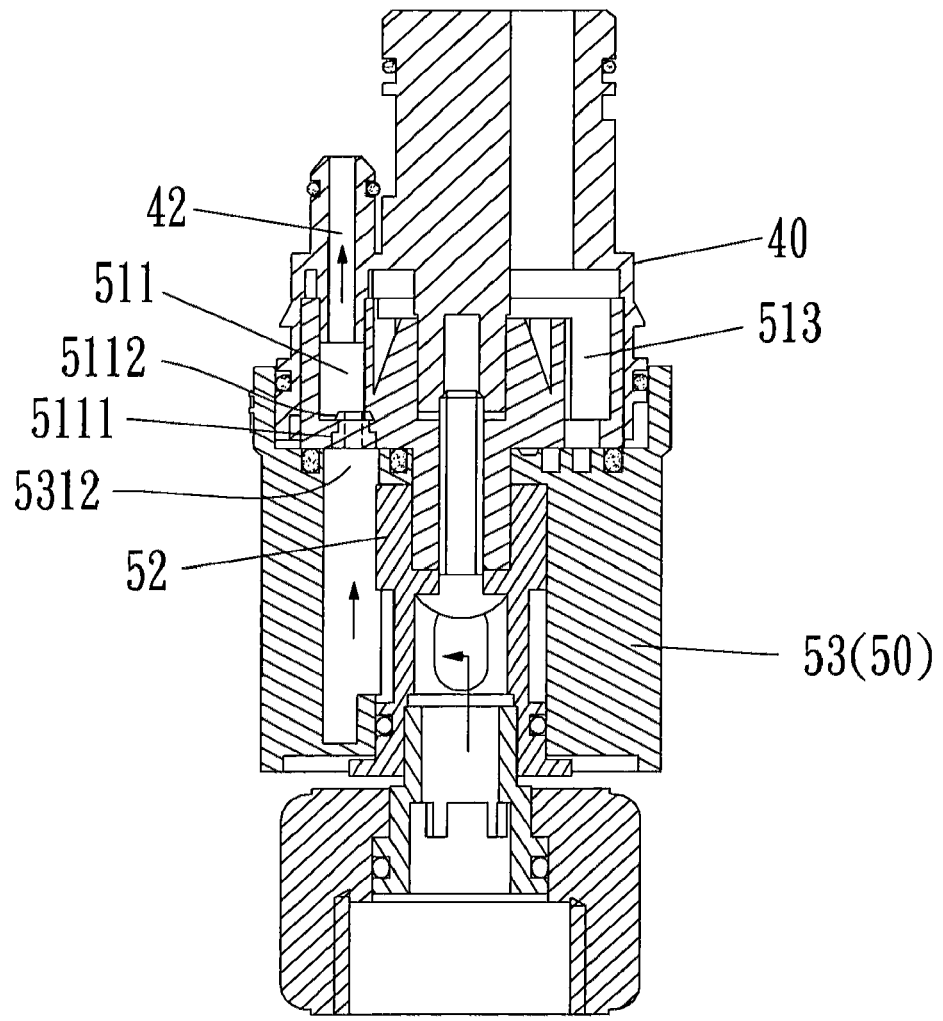
FIG. 15 is a cross-sectional drawing of an assembled front view illustrating a rotary switch rotating 180 degrees based upon a clockwise direction according to FIG. 3.

The internal pipe 10 of the telescopic water pipe structure of the invention is that one end of the internal pipe is connected to a garden spray nozzle 100 or a cleaning brush head (not shown in the figures), or an agricultural spraying device (not shown in the figures) for multiple implementation. Another end of the internal pipe 10 is fit to a pipe hole 21 of the external pipe 20. The external diameter of the internal pipe 10 is smaller than the internal diameter of the external pipe 20. An internal plug pipe 11 is fastened to the end of the internal pipe 10. A lower section portion of the internal plug pipe 11 is equipped with an outer ring groove 111. An internal plug water stop ring 112 is fit to the outer ring groove 111. The second external water passage 300 (as shown in FIG. 11) is formed to the relative fitting position between the external wall of the internal pipe 10 and the pipe hole 21 of the external pipe 20 through the outer edge of the internal plug water stop ring 112 capable of being closely attached to the internal wall of the pipe hole 21 of the external pipe 20. In addition, the second internal water passage 400 (as shown in FIG. 11) is formed between the pipe hole of the internal pipe 10 and the pipe hole 21 of the external pipe 20.

The first water passage 200 having the same axial direction and equivalent length is disposed to a side of the pipe hole 21 of the external pipe 20. An upper seal cap 30 having downward opening is fastened to an upper end of the pipe hole 21 of the external pipe 20. The pipe hole 21 of the external pipe 20 communicates with the first water passage 200 through an internal space 31 of the upper seal cap 30 to communicate with the first water passage 200 and the second external water passage 300. An upper end of the upper seal cap 30 has an upper hole 32 passed by the internal pipe 10. An internal pipe water stop ring 33 is disposed between the upper hole 32 and the outer circumference of the internal pipe 10 to prevent leakage (FIG. 10-1) between the internal pipe 10 and the upper seal cap 30. A lower seal cap 40 having opening bottom is fastened to a lower end of the external pipe 20. An independent main water passage 41 and a secondary water passage 42 are extended from an upper end of the lower seal cap 40 to respectively communicate to the pipe hole 21 of the external pipe 20 and the first water passage 200. In addition, a movable handlebar 23 capable of being randomly slid and shifted is fit to an outer portion of the external pipe 20 to provide a user to convenient operate.

A water passage control switch 50 is assembled to a bottom of the lower seal cap 40 and can introduce water flow into the first water passage 200 or the second internal water passage 400 through a rotary switch 53.

Accordingly, the effect of stretching out or retracting the length of the telescopic water pipe structure can be produced by allowing the internal pipe 10 and the external pipe 20 fit to each other to completely apply water pressure as a pushing force while introducing water flow into different water passages.

Continuously, partial decomposition drawings, component drawings, partial assembly drawings and schematic diagrams of relative position movement are illustrated in detail.

Figure 2:
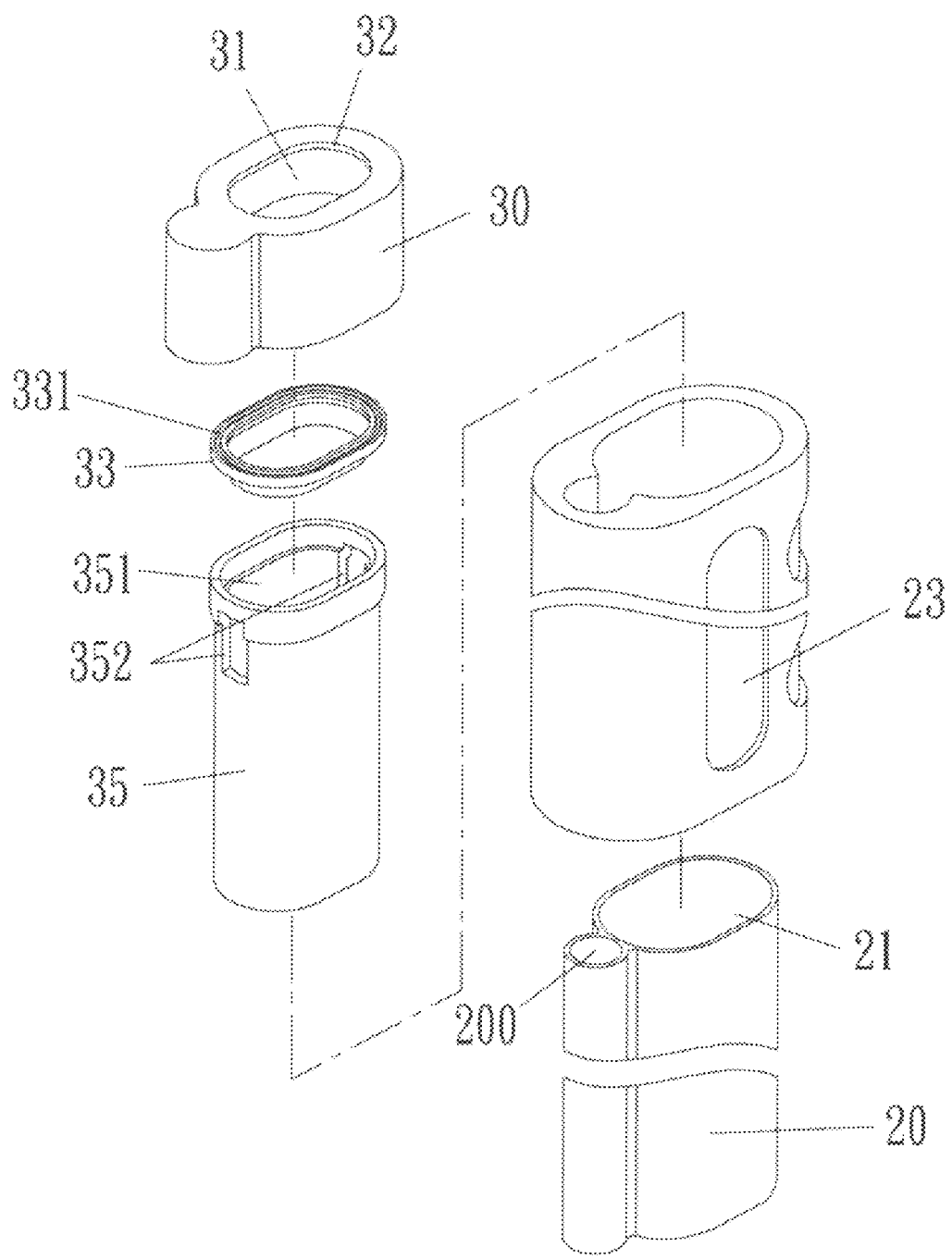
FIG. 2 is a decomposition drawing illustrating an external pipe according to a preferred embodiment of the present invention.

As shown in FIG. 2, the handlebar 23 is fit to the outer portion of the external pipe 20. The handlebar 23 can be randomly slid and shifted. The upper seal cap 30 fastened to the top of the external pipe 20 is integrated to the handlebar 23. As shown in FIG. 10 and FIG. 10-1, the pipe hole 21 of the external pipe 20 communicates with the first water passage 200 through an internal space 31 of the upper seal cap 30. Moreover, a protruding ring 34 is disposed to a bottom of the upper hole 32 of the upper seal cap 30 along its periphery. A recess ring 331 aligning the protruding ring 34 is disposed to an upper end of the internal pipe water stop ring 33. Therefore, the internal pipe water stop ring 33 has the positioning capability by embedding the protruding ring 34 and the recess ring 331. Moreover, a limit pipe 35 is fastened to a lower portion of the upper seal cap 30 relative to the upper hole 32 to avoid generating non-smoothness, such as the inclination angle or wedge, resulting from the excessive gap when the internal pipe 10 performs the displacement relative to the upper seal cap 30. A pipe hole 351 of the limit pipe 35 is slightly greater than the external diameter of the internal pipe 10. An external diameter of the limit pipe 35 is smaller than an internal diameter of the pipe hole 21 of the external pipe 20. An upper surface of the limit pipe 35 directly leans against a bottom surface of the internal pipe water stop ring 33. Symmetric window holes 352 are disposed to two sides of an upper section of the limit pipe 35. Accordingly, the upper seal cap 30 can allow the internal pipe 10 to vertically and smoothly slide through the disposition of the limit pipe 35.

As shown in FIG. 3, FIG. 7, FIG. 8, FIG. 11 and FIG. 13, decomposition drawings of a lower seal cap 40 and the water passage control switch 50 are illustrated. The structure of the lower seal cap 40 is a cap boy having the downward opening by incorporating with FIG. 4 and FIG. 12-1. A main water passage 41 and a secondary water passage 42 are respectively extended from an upper end of the cap body. The secondary water passage 42 is formed to a secondary water passage pipe 421. The secondary water passage pipe 421 is closely fit to the first water passage 200. A water stop ring I 422 is disposed between an outer portion of the secondary water passage pipe 421 and an internal wall of the first water passage 200. The main water passage 41 is formed to a main water passage pipe 411. The main water passage pipe 411 is fit to the pipe hole 21 of the external pipe 20. A water stop ring II 412 is disposed between an outer portion of the main water passage pipe 411 and an internal wall of the pipe hole 21. In addition, a protruding ring 423 corresponding to the secondary water passage 42 is extended from an inside of the lower seal cap 40. An axis cylinder 43 is disposed at an internal axial direction of the lower seal cap and can be connected to the water control switch 50.

The water passage control switch 50 includes a channel seal cap 51, a connecting pipe 52 and a rotary switch 53.

Figure 5:
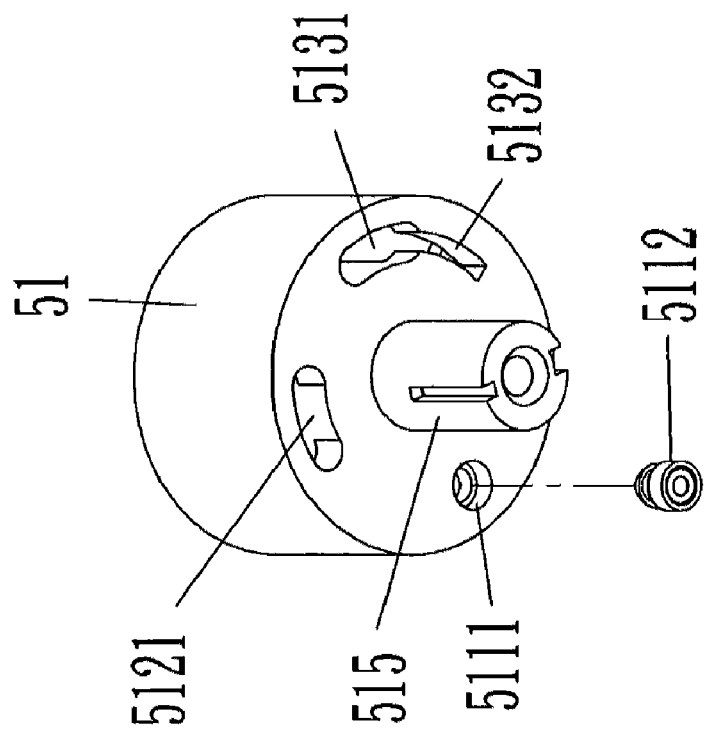
FIG. 5 is a bottom view drawing illustrating a channel seal cap according to a preferred embodiment of the present invention.

As shown in FIG. 5, the channel seal cap 51 is a cap body having the upward opening and has an axial hole 514 pivotally connected to the axis cylinder 43 of the lower seal cap 40. A first channel 511, a second channel 512 and a third channel 513 are independently and sequentially partitioned along a periphery of the axial hole 514. A first through hole 5111, a second through hole 5121 and a third through hole 5131 are respectively disposed to each bottom of the first channel 511, the second channel 512 and the third channel 513. A water stop plug ring 5112 is fit to the first through hole 5111. An extension groove 5132 is formed to a side of the third through hole 5131. A limit cylinder 515 is extended from a bottom and passes through ha connecting pipe 52. A closing state is shown after the channel seal cap 51 is assembled inside of the lower seal cap 40. A proper height space is still kept between the inside of the lower seal cap 40 and a top of the channel seal cap 51. An upper end of the first channel 511 is closely fit and cascaded to the protruding ring 423 of the lower seal cap 40. Accordingly, as shown in FIG. 10, FIG. 10-1, FIG. 12-1, FIG. 12-2, FIG. 12-5 and FIG. 15, the first channel 511, the secondary water passage 42, the first water passage 200, the internal space 31 of the upper seal cap 30 and the second external water passage 300 are cascaded to form an independent water passage. As shown in FIG. 11, FIG. 12-1, FIG. 12-4, FIG. 13, and FIG. 14, the second channel 512 and the third channel 513 can be respectively and directly connected to the main water passage 41 through the lower seal cap 40 and connected to the second internal water passage 400 through the main water passage 41.

Figure 3:
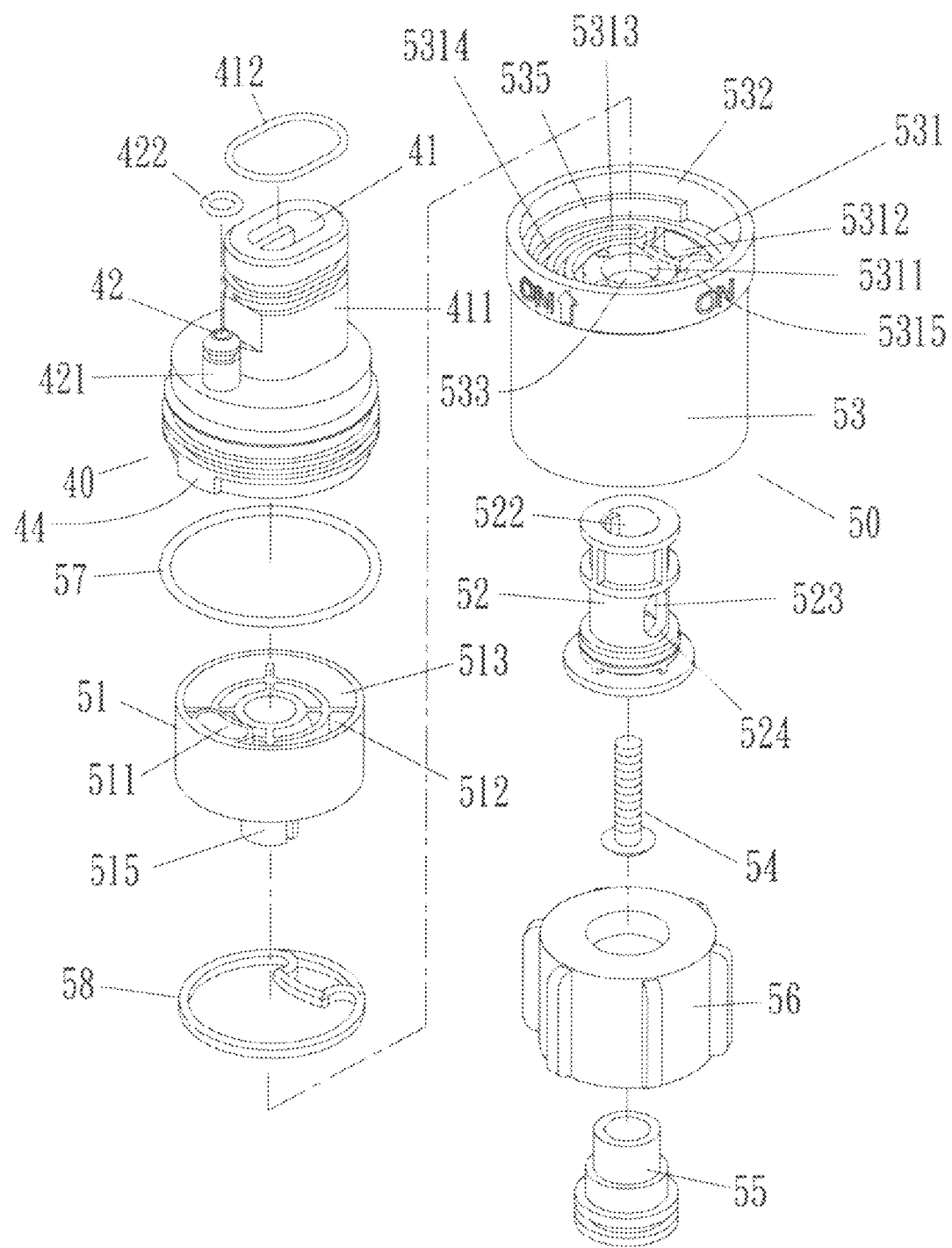
FIG. 3 is a decomposition drawing illustrating a water passage control switch according to a preferred embodiment of the present invention.

As shown in FIG. 3, a horizontal plate 521 having a circular hole 5211 is disposed inside of the connecting pipe 52 to allow its inside to form an upper pipe hole 522 and a lower pipe hole 523. The upper pipe hole 522 is passed by the limit cylinder 515 of the channel seal cap 51 and a screw 54 is screwed into a predetermined central hole of the limit cylinder 515 from the lower pipe hole 523 by passing through the circular hole 5211 so that the channel seal cap 51 is integrated with the connecting pipe 52. A certain space is preset to a bottom portion of the channel seal cap 51 and a top surface of the connecting pipe 52 to provide for assembling the rotary switch 51 so as to perform the twisting and regulating. The lower pipe hole 523 does not only have symmetric side holes 524, but also has a water stop ring III 525 fit to the lower portion. In addition, by fastening a stage positioning pipe 55, a water pipe connector 56 is disposed between the stage positioning pipe 55 and the connecting pipe 52 to connect a water source.

Figures 1, 6:
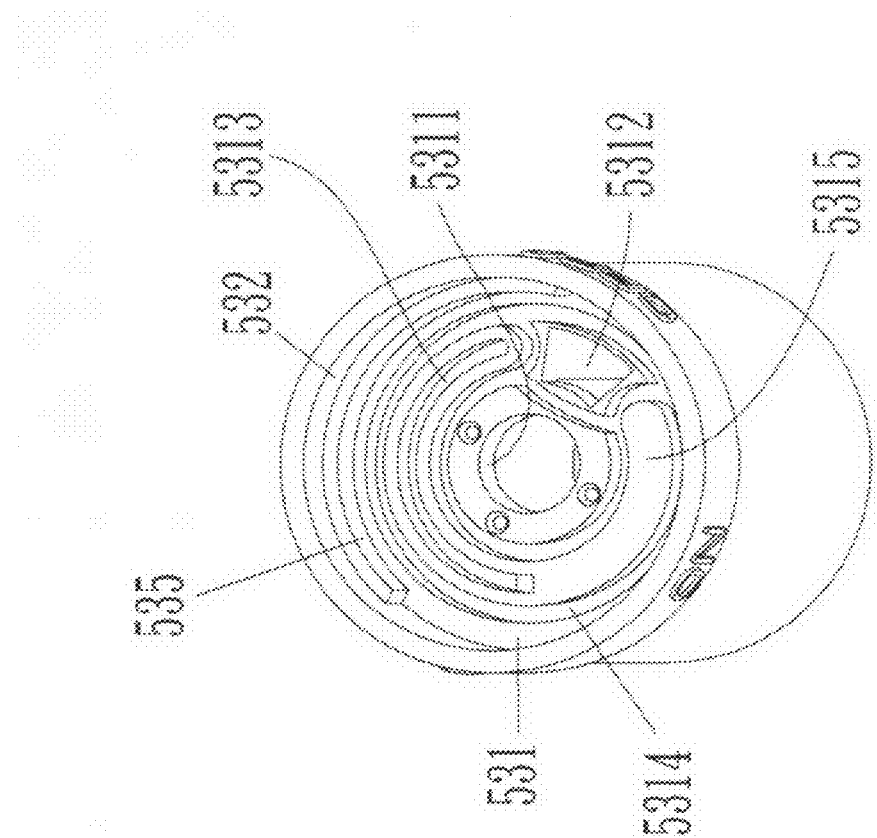
FIG. 6 is a cross-sectional drawing illustrating a rotary switch according to a preferred embodiment of the present invention.
Figure 6:
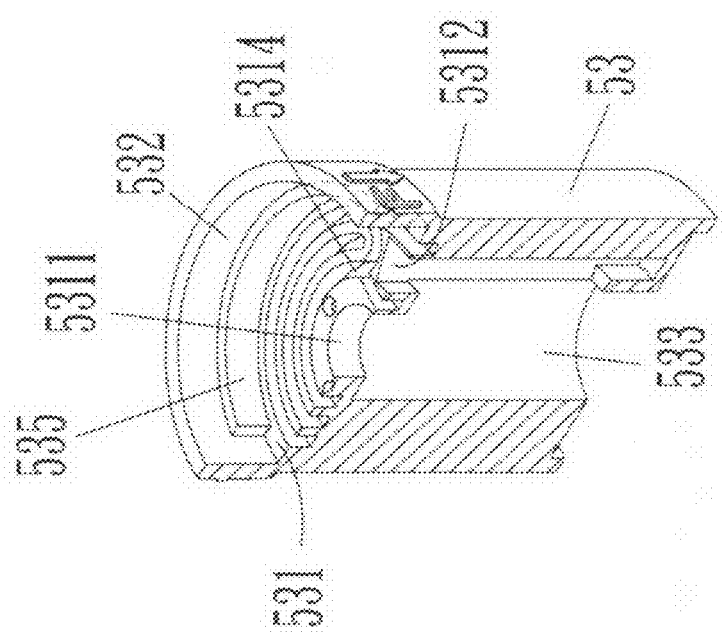
Figure 7:
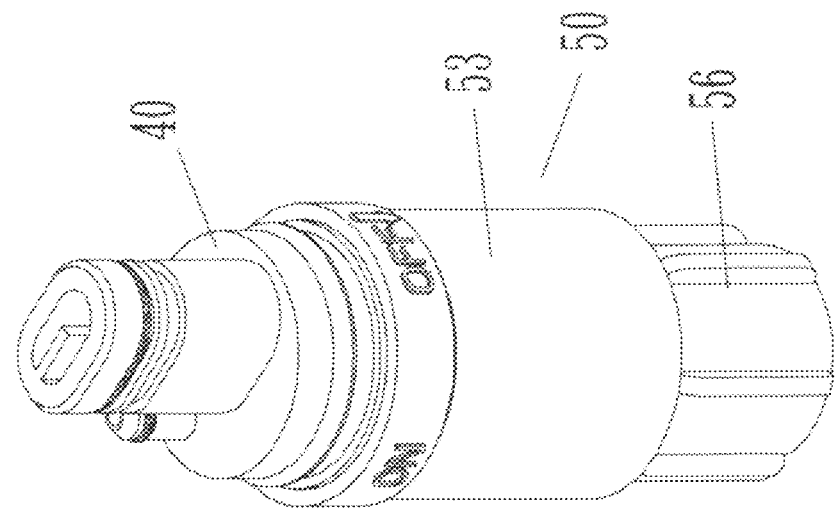
FIG. 7 is an assembly drawing according to FIG. 3.
Figure 8:
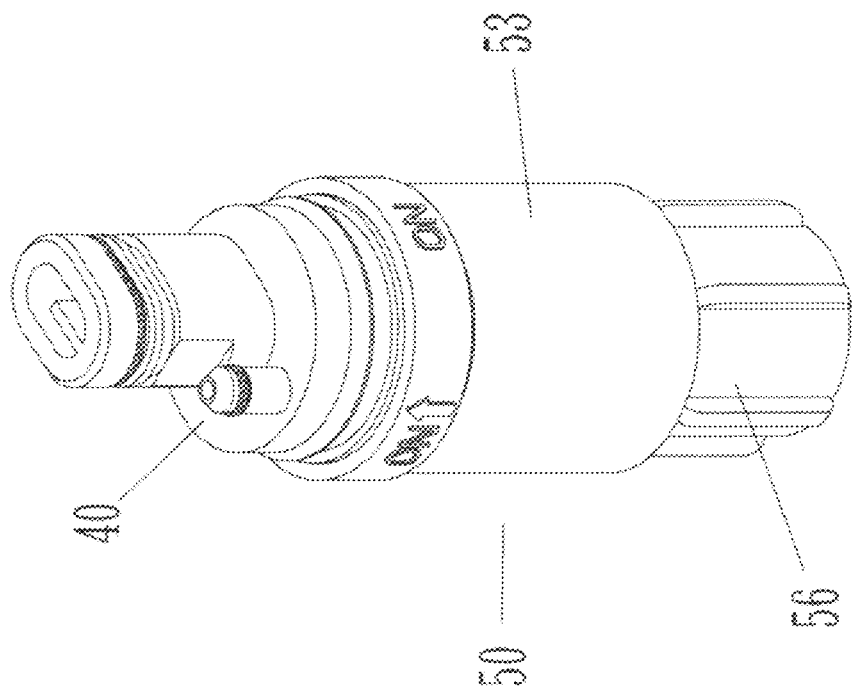
FIG. 8 is a schematic diagram illustrating another angle according to FIG. 3.

As shown in FIG. 6 and FIG. 6-1, a partition 531 is horizontally disposed inside the rotary switch 53 to partition an upper accommodating chamber 532 and a lower accommodating chamber 533. A lower section portion of the lower seal cap 40 is contained in the upper accommodating chamber 532. A water stop ring IV 57 is disposed between an external periphery of a lower section portion of the lower seal cap 40 and an internal periphery of the upper accommodating chamber 532. A center circular hole 5311 is disposed to the partition 531 and is passed by the limit cylinder 515 of the channel seal cap 51. A penetration hole 5312 is disposed to a side of the partition 531 to penetrate the upper accommodating chamber 532 and the lower accommodating chamber 533. An interconnection channel 5313, a limit recess 5314, an arc plane 5315 are mainly disposed to the upper end of the partition 531. A water stop ring 58 is fit inside of the limit recess 531 to surround the peripheries of the interconnection channel 5313 and the penetration hole 5312. The connecting pipe 52 can be completely contained in the lower accommodating chamber 533 of the rotary 53 and an external circumference of the water stop ring III 525 of the connecting pipe 52 can be attached to an internal wall of the lower accommodating chamber 533. When the rotary switch 53 is assembled between the channel seal cap 51 and the connecting pipe 52 to form a rotating state, the top surface of the water stop ring 58 and the top surface of the partition 531 can be tightly attached to the bottom surface of the channel seal cap 51.

After the assembly for detail positions of each component is illustrated, the implementation and operation of the method for adjusting the telescopic water pipe structure of the invention includes three different configurations:

1. As shown in FIG. 12-1, FIG. 12-2, FIG. 12-5 and FIG. 15, when the penetration hole 5312 of the rotary switch 53 aligns the first through hole 5111 of the first channel 511 of the channel seal cap 51, water flow is finally introduced into the second external water passage 300 (as shown in FIG. 10 and FIG. 10-1) from the secondary water passage 42 by passing through the first water passage 200. The internal plug pipe 11 (as shown in FIG. 11) fastened to the internal pipe 10 is pushed by water pressure to vertically move to retract the internal pipe 10 toward the inside of the external pipe 20 gradually. The function of automatically retracting the length of the telescopic water pipe can be achieved by utilizing the driving of the water pressure.

2. As shown in FIG. 12-1, FIG. 12-2, FIG. 12-4 and FIG. 14, after the penetration hole 5312 of the rotary switch 53 aligns the second through hole 5121 of the second channel 512 of the channel seal cap 51, the bottom \portion of the water stop plug ring 5112 fit to the first through hole 5111 is exactly and tightly attached to the arc plane 5315 of the rotary switch 53 to form a complete sealing state. Therefore, water originally remaining in the first water passage 200 is unable to be drained away to form a dead storage so that the retracting and stretching lengths of the internal pipe 10 and the external pipe 20 are retained at the present state. On the other hand, water flow enters the second channel 512 from the second through hole 5121 and is drained by the second internal water passage 400 composed of cascading the internal pipe 10 and the external pipe 20 from the main water passage 41.

3. As shown in FIG. 12-1, FIG. 12-2, FIG. 12-3 and FIG. 13, after the penetration hole 5312 of the rotary switch 53 aligns the third through hole 5131 of the third channel 513 of the channel seal cap 51, the interconnection groove 5313 is exactly located between the first through hole 5111 of the first channel 511 and the extension groove 5132 of the third channel 513 to form a cascade state. Therefore, water originally stayed in the first water passage 200 is introduced into the third channel 513 through the extension groove 5132 and the third through hole 5131 by utilizing the interconnection groove 5313. With the design of the inventor(s), the bore diameter of the interconnection groove 5313 is smaller than the penetration hole 5312. The inside of the second internal water passage 400 can obtain greater water flow. Moreover, when the water pressure of the second internal water passage 400 is greater than the water pressure of the first water passage 200, the internal pipe 10 is slowly pushed toward the outside by using the water pressure of the second internal water passage 400 to achieve the function of stretching the length of the telescopic water pipe.

Further, as shown in FIG. 1, FIG. 3, FIG. 4 and FIG. 6, a telescopic water pipe structure of the invention is illustrated. To allow the penetration hole 5313 of the rotary switch 53 to accurately align the first through hole 5111, the second through hole 5121 and the third through hole 5131 corresponding to the first channel 511, the second channel 512, and the third channel 513 of the channel seal cap 51, an outer cover 60 is fastened to an external portion of the upper end of the lower seal cap 40. A benchmark 61 is disposed to a predetermined place of an external portion of the outer cover 60. A plurality of indication signs 534 can be disposed to an external portion of the upper end of the rotary switch 53 based upon the proper distances and can be rotated to align the position of the benchmark 61. Therefore, since the benchmark 61 is aligned by the different indication signs 534, the retracting configuration or the stretching configuration provided by the internal and external pipes can be rapidly recognized.

In addition, since the first channel 511 and the third channel 513 are disposed to the relatively external side of the axial hole 514 of the channel seal cap 51, a positioning function is designed for the penetration hole 5312 respectively aligning the first channel 511 and the third channel 513 of the rotary switch 51. A protruding seat 44 is formed at an external bottom side of the lower seal cap 40. A semi-convex ring 535 is formed to an internal wall of the upper accommodating chamber 532 of the rotary switch 53. When the penetration hole 5312 is adjusted to respectively align the first channel 511 and the third channel 513, the relatively external side of the semi-convex rim 535 can lean against the correspondingly external side of the protruding seat 44.

Figure 17:
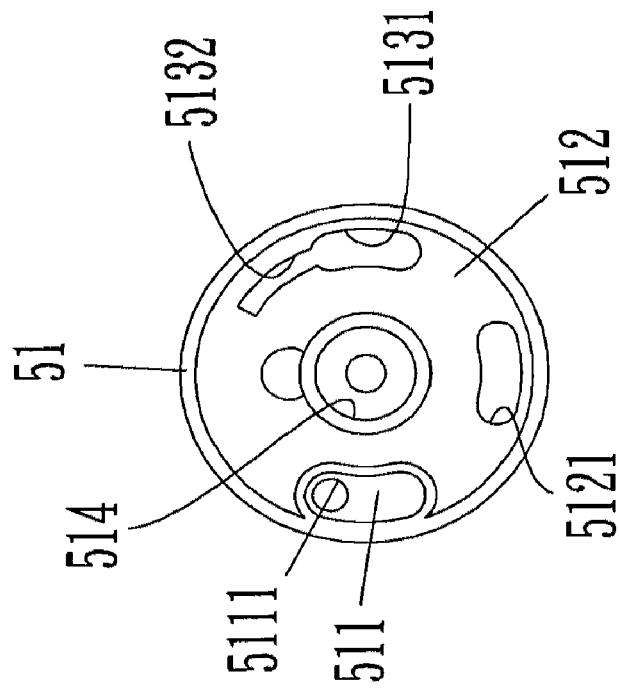
FIG. 17 is a top view drawing illustrating a channel seal cap according to another equivalent embodiment of the present invention.
Figure 16:
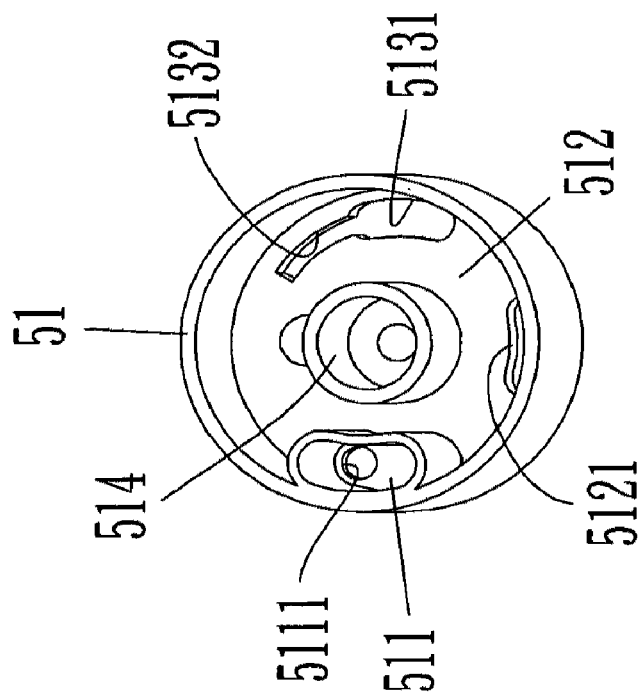
FIG. 16 is a stereogram illustrating a channel seal cap according to another equivalent embodiment of the present invention.

As shown in FIG. 16 and FIG. 17, another equivalent embodiment of the channel seal cap 51 of the invention is illustrated. The first channel 511 and the second channel 512 are preset to an external periphery of the axial hole 514. A bottom portion of the first channel 511 has the first through hole 5111. The second through hole 5121 and the third through hole 5131 are disposed to a bottom portion of the second channel 512 based upon the proper distance. The extension groove 5132 is disposed to a side of the third through hole 5131 so as to consolidate the second channel and the third channel shown in the former embodiment. Accordingly, the first through hole 5111, the second through hole 5121 and the third through hole 5131 can be regulated to align the penetration hole 5312 of the rotary switch 53 (as shown in FIG. 18).

Figure 19:
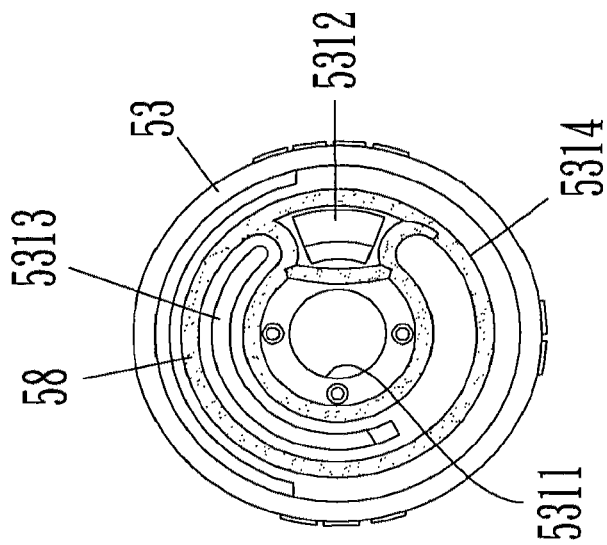
FIG. 19 is a top view drawing according to FIG. 18.
Figure 18:
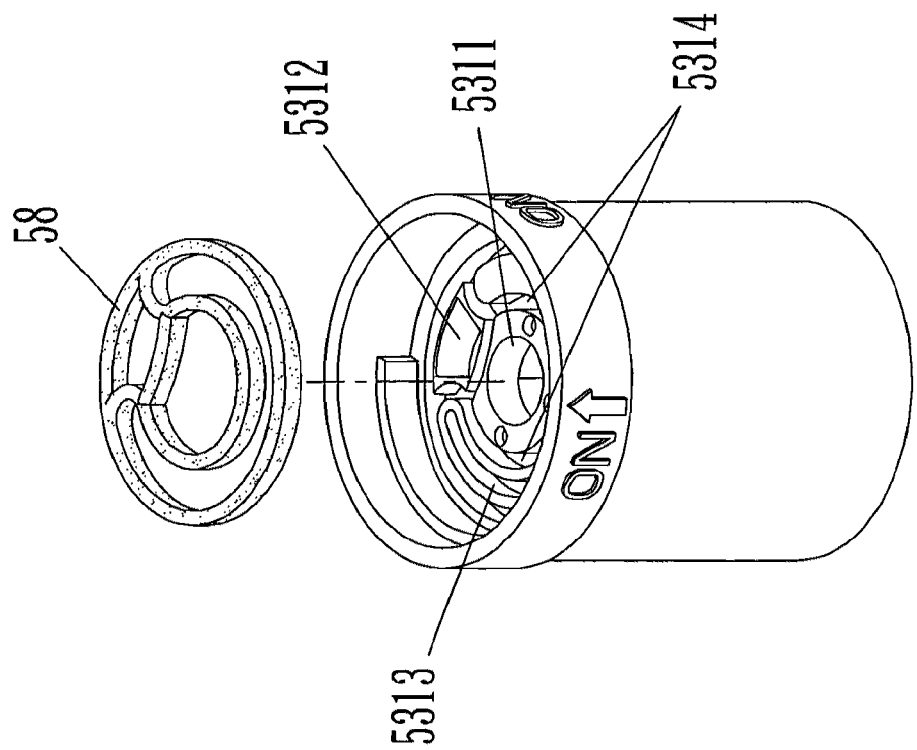
FIG. 18 is a decomposition drawing illustrating a water stop ring and a rotary switch according to another assembly embodiment of the present invention.

As shown in FIG. 18 and FIG. 19, the water stop ring 58 fit to the limit recess 5314 of the rotary switch 53 can surround the center circular hole 5311, the penetration hole 5312 and the interconnection groove 5313 of the rotary switch 53 so that better waterproof and leak prevention can be provided after the rotary switch 53 is assembled to the channel seal cap 51.

Figure 21:
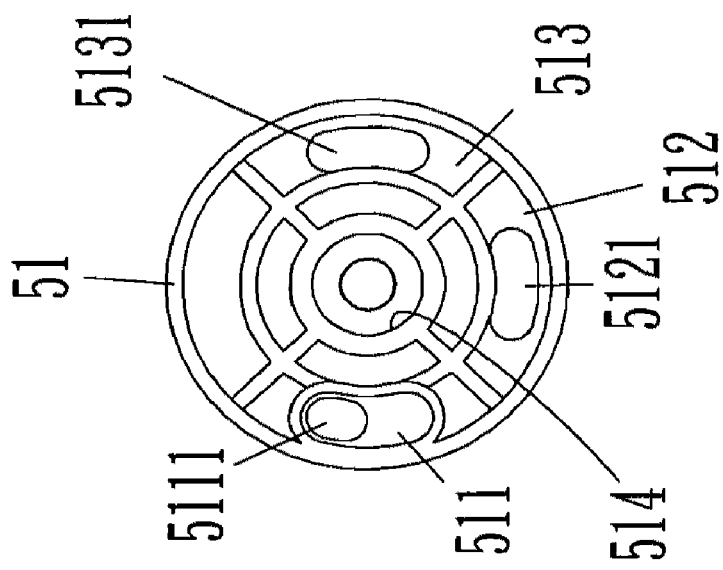
FIG. 21 is a top view drawing according to FIG. 20.
Figure 20:
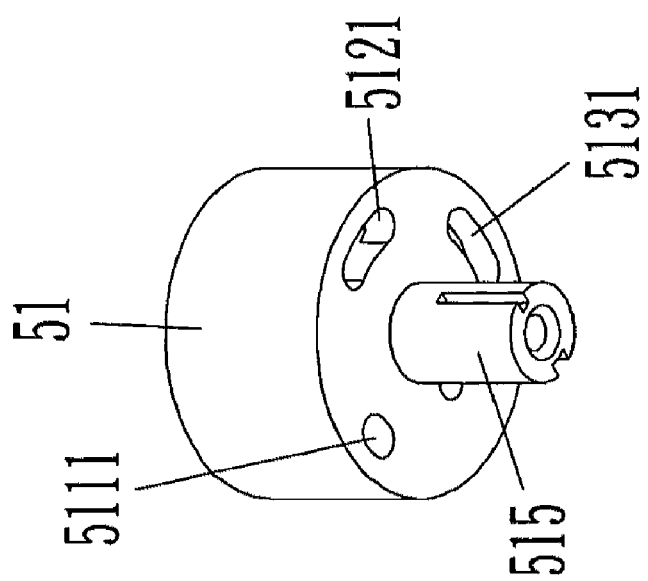
FIG. 20 is a bottom view stereogram illustrating a channel seal cap according to a further equivalent embodiment of the present invention.
Figures 1, 22:
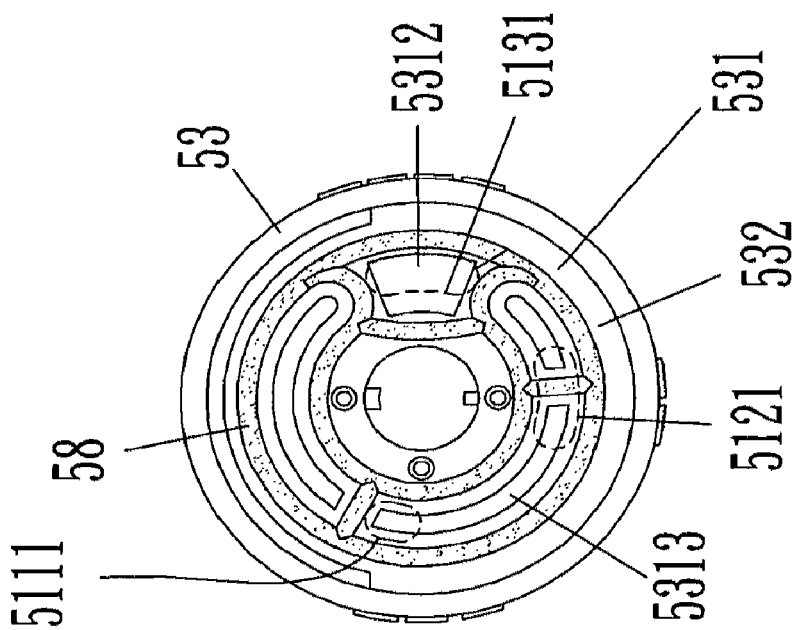
FIG. 22 is a cross-sectional drawing illustrating a rotary switch according to a further equivalent embodiment of the present invention.
Figure 22:
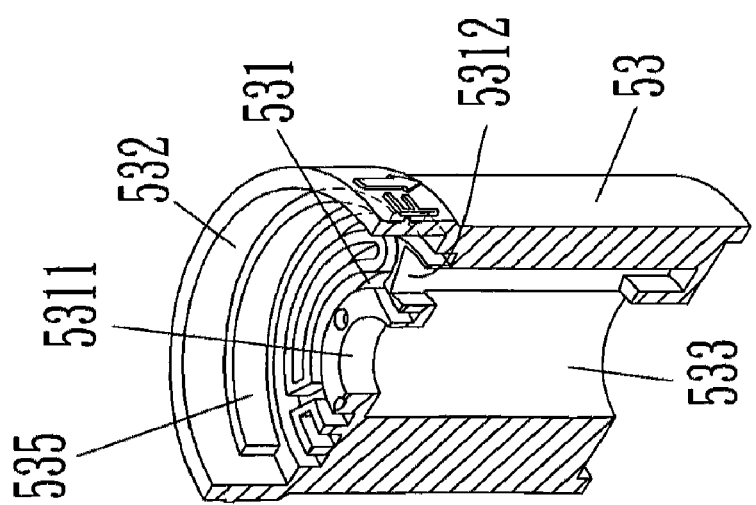
Figures 3, 22:
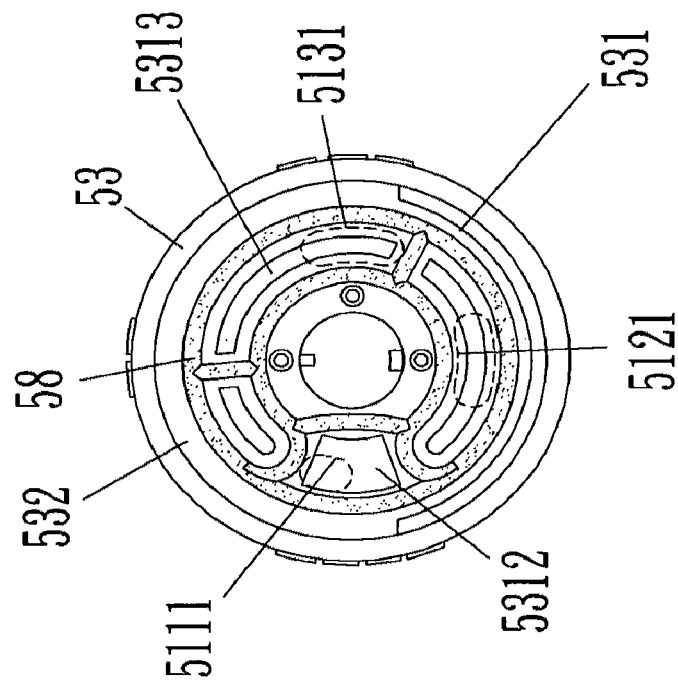
Figures 2, 22:
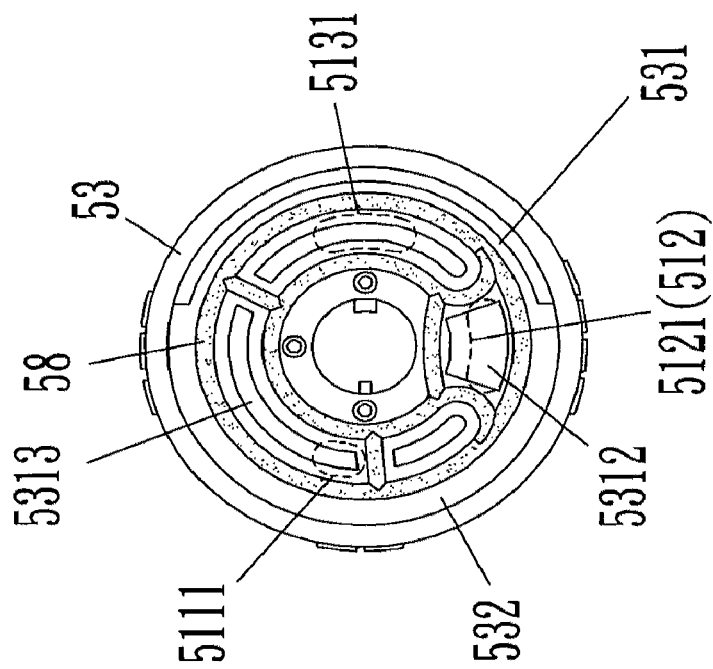

Please refer to FIG. 20 to FIG. 22, an embodiment reference drawings illustrate the channel seal cap 51 derived by another equivalent technique and the rotary switch 53 derived by another equivalent technique.

Figure 4:
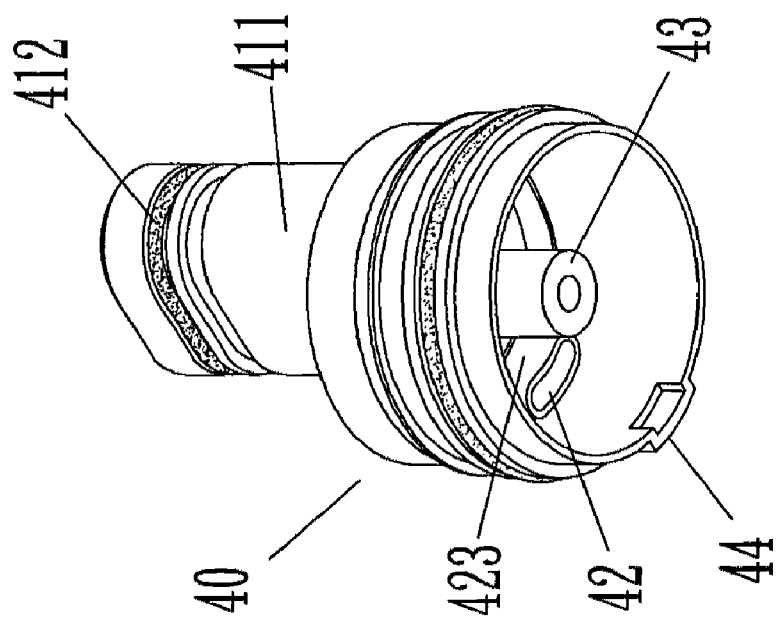
FIG. 4 is a bottom view drawing illustrating a seal cap according to a preferred embodiment of the present invention.
Figure 23:
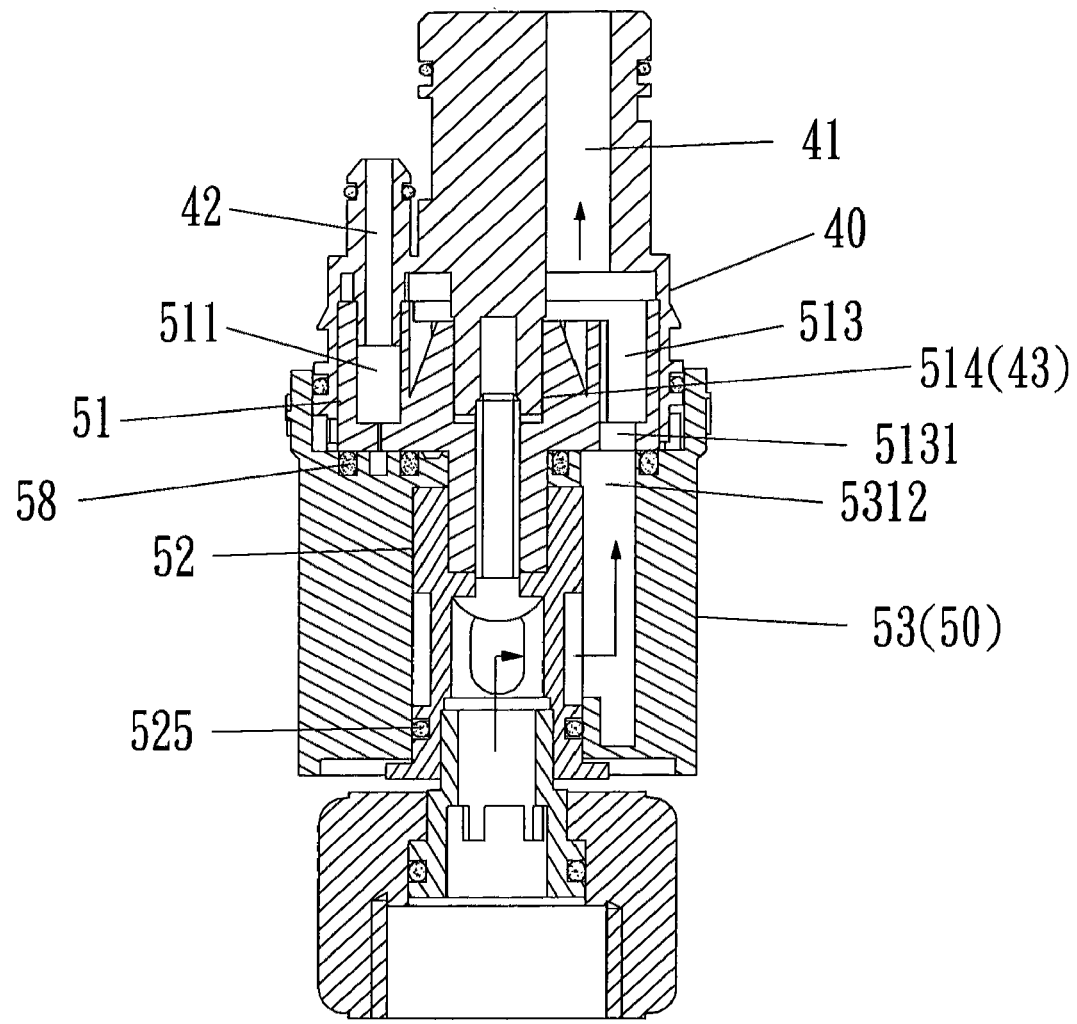
FIG. 23 is an assembled cross-sectional drawing illustrating a channel seal cap of relative position shown in FIG. 22-1 combined a rotary switch with a lower seal cap shown in FIG. 22.
Figure 25:
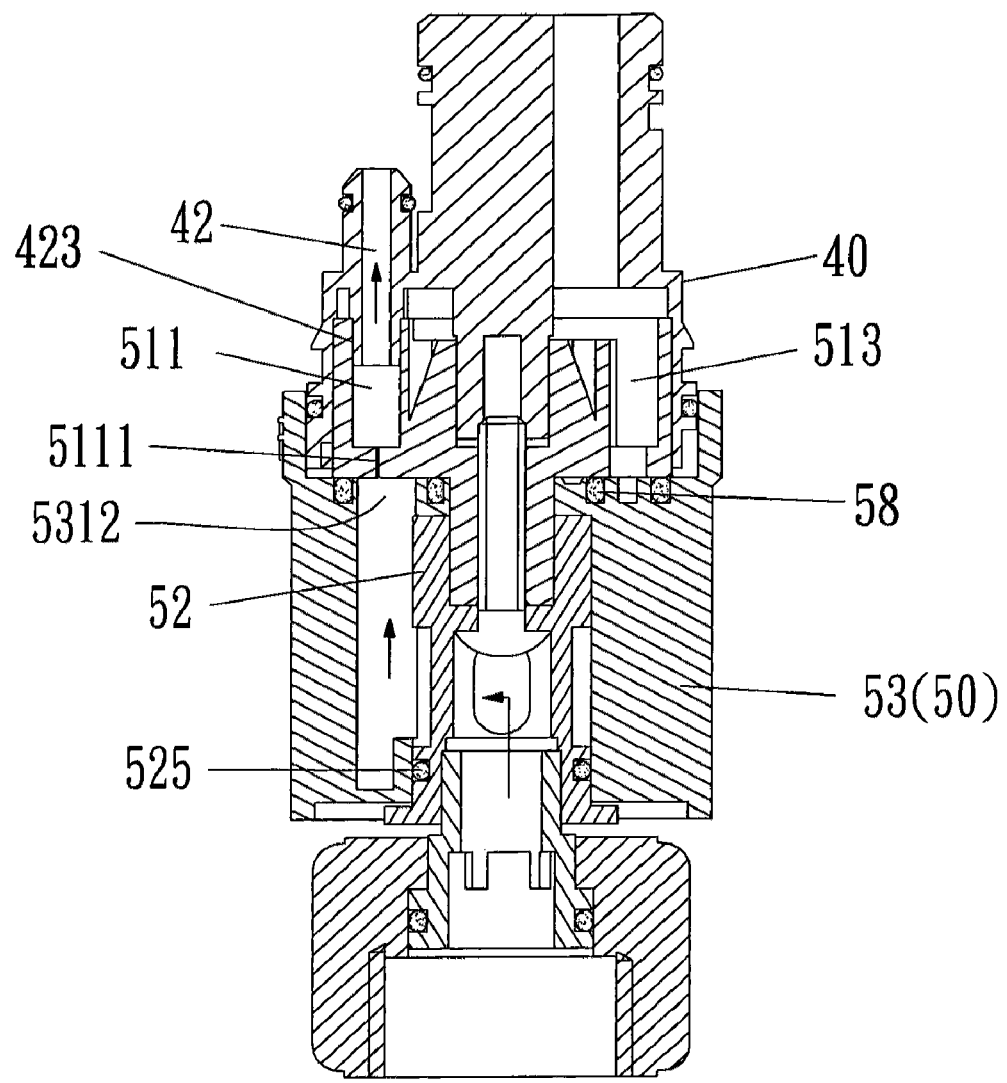
FIG. 25 is an assembled cross-sectional drawing illustrating a channel seal cap of relative position shown in FIG. 22-3 combined a rotary switch with a lower seal cap shown in FIG. 22.

The channel seal cap 51 completely remains the appearance shown in FIG. 5 and only seals the extension groove 5132 (as shown in FIG. 5) extended from a side of the third through hole 5131. The channel seal cap 51 has the axial hole 514 at the cap body having the upward opening to pivotally connect the axis cylinder 54 of the lower seal cap 40. The first channel 511, the second channel 512 and the third channel 513 are disposed along the outer periphery of the axial hole 514. Each bottom of the first channel 511, the second channel 512 and the third channel 513 respectively correspond the first through hole 5111, the second through hole 5121 and the third through hole 5131. The limit cylinder 515 is disposed to the bottom of the channel seal cap to connect a connecting pipe 52. As shown in FIG. 23, the channel seal cap 51 is assembled to the inside of the lower seal cap 40 to form a sealing state. The proper height space is preset between the top surface inside the lower seal cap 40 and the top surface of the channel seal cap 51. The upper end of the first channel 511 can lean against a convex ring 423 of the lower seal cap 40 (as shown in FIG. 4 and FIG. 25). Accordingly, the first channel 511 can communicate with the secondary water passage 42 (as shown in FIG. 25).

Figure 24:
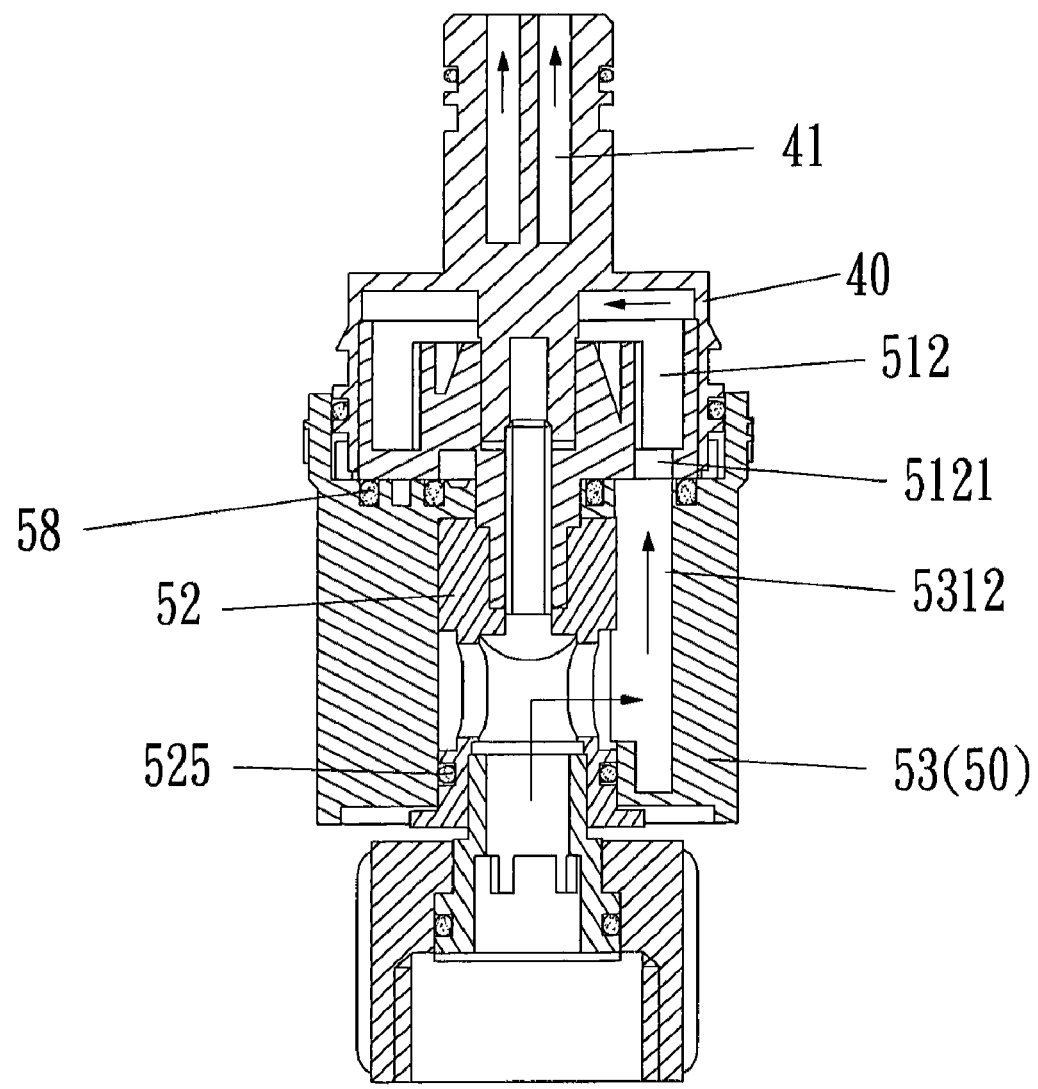
FIG. 24 is an assembled cross-sectional drawing illustrating a channel seal cap of relative position shown in FIG. 22-2 combined a rotary switch with a lower seal cap shown in FIG. 22.

The upper accommodating chamber 532 and the lower accommodating chamber 533 are divided by the partition 531 of the rotary switch 53. The partition 531 has the center circular hole 5311 passed by the limit cylinder 515 of the channel seal cap 51. A side of the partition 531 has the penetration hole 5312 for penetrating the upper accommodating chamber 532 and the lower accommodating chamber 533. The interconnection groove 5313 is disposed to the upper end of the partition 531. The water stop ring 58 can surround the circumferences of the interconnection groove 5313 and the penetration hole 5312. The lower accommodating chamber 533 of the rotary switch 53 can completely accommodate the connecting pipe 52 and the outer circumference the water stop ring III 525 of the connecting pipe 52 can attach the internal wall of the lower accommodating chamber 533. When the rotary switch 53 is assembled between the channel seal cap 51 and the connecting pipe 52 to form the rotating state, the top surface of the water stop ring 58 and the top surface of the partition 531 can be tightly attached to the bottom surface of the channel seal cap 51 (as shown in FIG. 23 to FIG. 25).

Accordingly, as shown in FIG. 21, FIG. 22-3 and FIG. 25, when the penetration hole 5312 of the rotary switch 53 is adjusted to align the first through hole 5111 of the first channel 511 of the channel seal cap 51, water flow is finally introduced into the second external water passage 300 from the secondary water passage 42 by passing through the first water passage 200 (please refer to FIG. 10 and FIG. 11). The internal plug pipe 11 integrated to the internal pipe 10 is pushed by water pressure force to vertically move to retract the internal pipe 10 toward the external pipe 20 gradually so that the function of automatically retracting the length of the telescopic water pipe can be achieved by utilizing the driving of the water pressure.

As shown in FIG. 21, FIG. 22-2, and FIG. 24, after the penetration n hole 5312 of the rotary switch 53 is adjusted to align the second through hole 5121 of the second channel 512 of the channel seal cap 51, the first channel 511 is completely sealed. Therefore, water originally stayed in the first water passage 200 is unable to be drained away to form a dead storage so that the retracting and stretching lengths of the internal pipe 10 and the external pipe 20 are retained at the present state. On the other hand, water flow enters the second channel 512 from the second through hole 5121 and is drained by the second internal water passage 400 composed of cascading the internal pipe 10 and the external pipe 20 from the main water passage 41 (please refer to FIG. 10 and FIG. 11).

As shown in FIG. 22, FIG. 22-1, FIG. 23, FIG. 10 and FIG. 11, after the penetration hole 5312 of the rotary switch 53 is adjusted to align the third through hole 5131 of the third channel 513 of the channel seal cap 51, the interconnection groove 5313 is exactly located between the first through hole 5111 of the first channel 511 and the second through hole 5121 of the second channel 512 to form a cascade state. Therefore, water originally stayed in the first water passage 200 is introduced into the second channel 512 through the interconnection groove 5313. Since the bore diameter of the interconnection groove 5313 is smaller than the penetration hole 5312, the inside of the second internal water passage 400 can obtain greater water flow. Moreover, when the water pressure of the second internal water passage 400 is greater than the water pressure of the first water passage 200, the internal pipe 10 is slowly pushed toward the outside by using the water pressure of the second internal water passage 400 to achieve the function of stretching the length of the telescopic water pipe.

Figure 26:
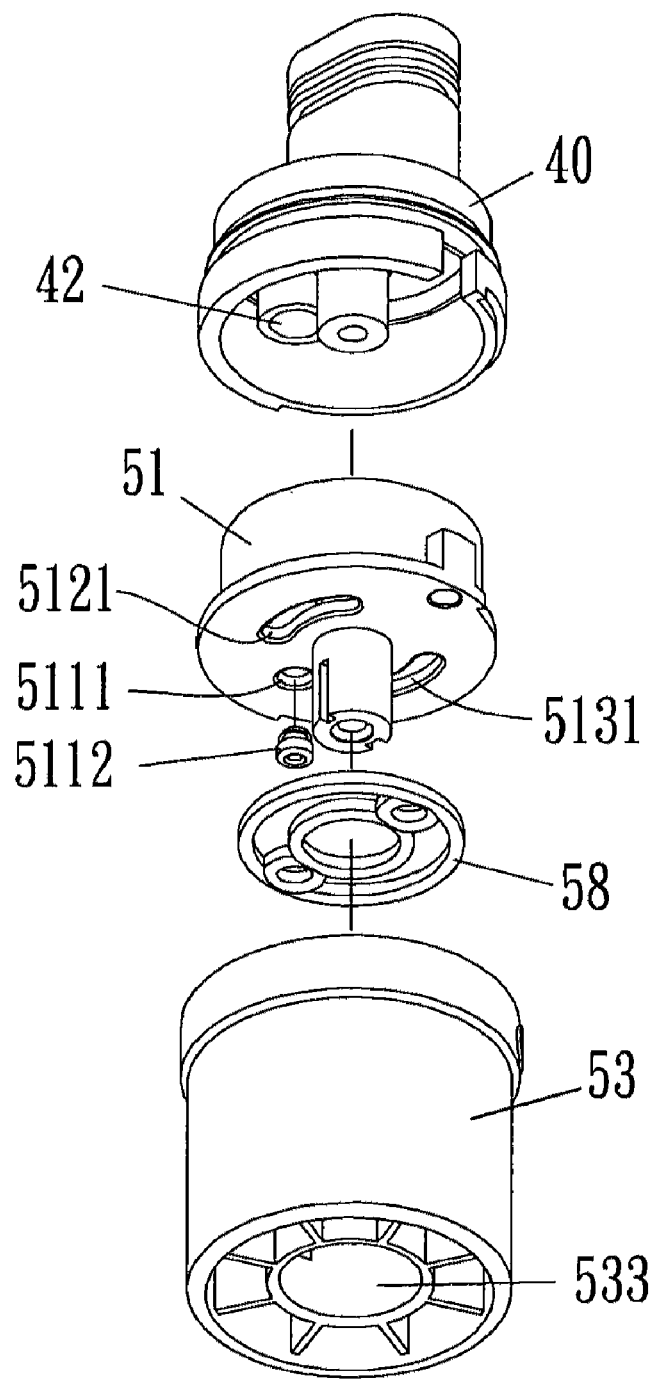
FIG. 26 is a decomposition drawing illustrating a water passage control switch according to another preferred embodiment of the present invention.
Figure 27:
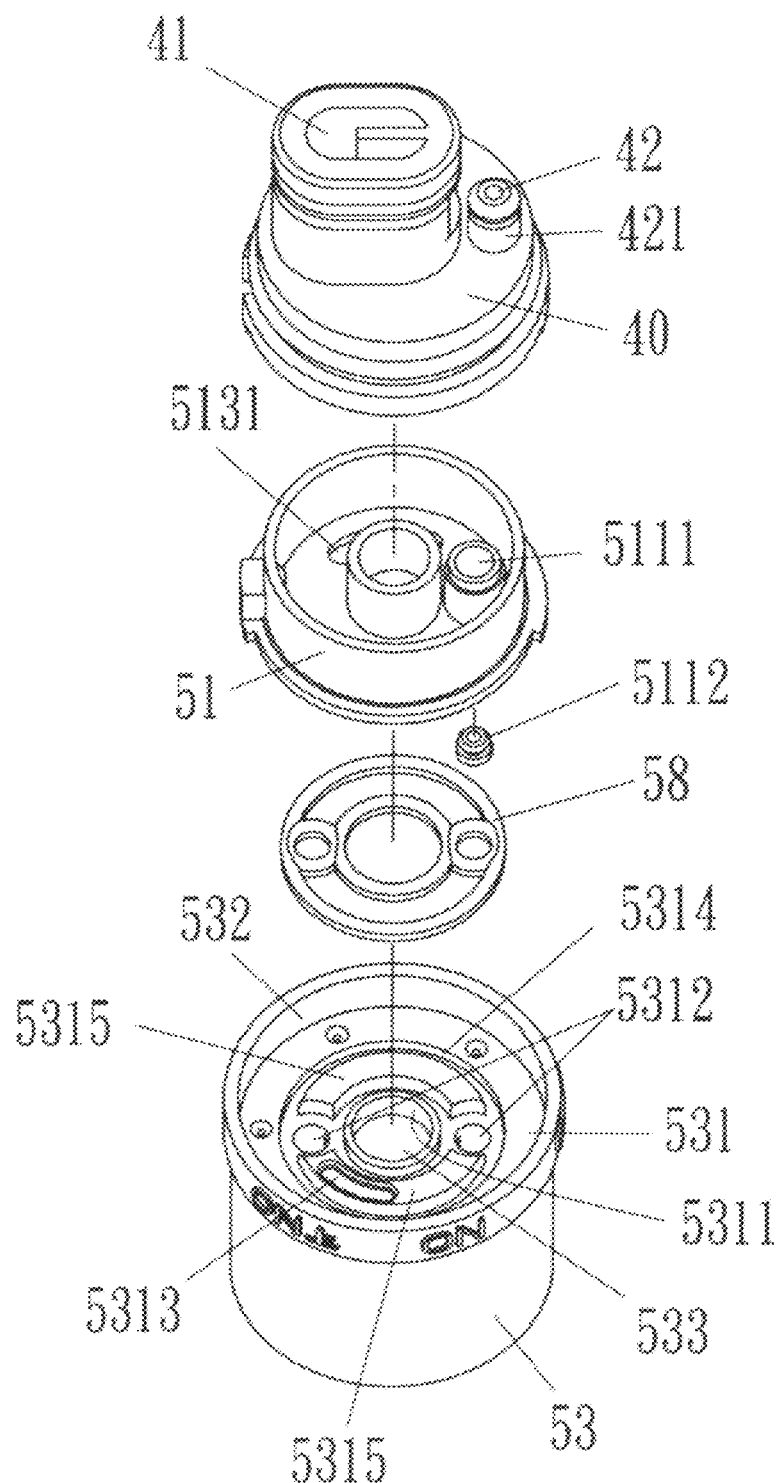
FIG. 27 is a schematic diagram of another angle according to FIG. 26.

As shown in FIG. 26 and FIG. 27, decomposition drawings depict a water passage control switch according to another preferred embodiment of the present invention. The penetration hole 5312 disposed to the rotary switch 53 can be increased to two from the one and is disposed at the two sides of the lower accommodating chamber 533 becoming symmetric relations. The water stop ring 58 and the channel seal cap 51 fit on the rotary switch 53 incorporate with the design of dual penetration holes 5312. Dual water outlets disposed at the water stop ring 58 can align the dual penetration holes and slightly shift the relative positions of the first through hole 5111, the second through hole 5121 and the third through hole 5131 at the bottom of the channel seal cap 51. Accordingly, the water outflow is increased.

Although the features and advantages of the embodiments according to the preferred invention are disclosed, it is not limited to the embodiments described above, but encompasses any and all modifications and changes within the spirit and scope of the following claims.

What is claimed is:

1. A telescopic water pipe structure comprising: an internal pipe and an external pipe fit to each other, an internal plug pipe fixedly connected to a lower portion of the internal pipe to form a second internal water passage and a second external water passage, a first water passage disposed to a side of a pipe hole of the external pipe, an upper seal cap fixedly connected to an upper portion of the pipe hole to cascade a first water passage and the second external water passage, a lower seal cap fixedly connected to a lower portion of the external pipe, a main water passage extended from an upper portion of the lower seal cap to connect the pipe hole of the external pipe so as to connect a second internal water passage, a secondary water passage connected to the first water passage;

a water passage control switch connected to the lower seal cap, the water passage control switch having a channel seal cap disposed in the water passage control switch, a first channel independently partitioned to the channel seal cap to connect the secondary water passage, a second channel and a third channel connected to the main water passage, a first through hole, a second through hole and a third through hole respectively corresponding to bottoms of the first channel, the second channel and the third channel, a water stop ring fit to the first through hole, an extension groove disposed to a side of the third through hole; and a rotary switch connected to a top of the channel seal cap, a penetration hole being disposed to a partition attached to a bottom of the channel seal cap, an interconnection channel and an arc plane disposed to an upper portion of the partition;

wherein the internal pipe is pushed toward an inside of the external pipe to shorten a length of the telescopic water pipe structure when the penetration hole of the rotary switch aligns the first through hole of the first channel for communicating with the first water passage, and a bottom of the water stop ring fit to the first through hole is exactly and closely pasted to the arc plane to form a sealing state and an original length of the telescopic water pipe structure is kept when the penetration hole aligns the second through hole of the second channel for communicating with the second internal water passage, and the first through hole and the extension groove are exactly connected to the interconnection channel to stretch and prolong the telescopic water pipe structure when the penetration hole is communicated to the third through hole of the third channel.

2. The telescopic water pipe structure as claimed in claim 1, wherein the external pipe has a first water passage and a pipe hole arranged in parallel along an axial direction, and the internal pipe is fit into a pipe hole of the external pipe, and an internal plug pipe is fastened to a fitting end of the pipe hole, and an internal water stop ring is disposed between the internal plug pipe and the pipe hole of the external pipe to form a second external water passage between a periphery of the internal pipe and the pipe hole of the external pipe; and a second internal water passage is formed by cascading the pipe hole of the internal pipe and the pipe hole of the external pipe.

3. The telescopic water pipe structure as claimed in claim 1, wherein the upper seal cap is fastened to a terminal of the external pipe provided for fitting the internal pipe and is a cap body having a downward opening, and has an upper hole passed by the internal pipe, and an internal pipe water stop ring is disposed between the upper seal cap and the internal pipe.

4. The telescopic water pipe structure as claimed in claim 1, wherein a lower terminal of the external pipe is fastened to a lower seal cap, and the lower seal cap is connected to the water passage control switch, and the water passage control switch regulates water flow entering the first water passage or the second internal water passage.

5. The telescopic water pipe structure as claimed in claim 1, wherein an external diameter of the internal pipe is smaller than an internal diameter of the pipe hole of the external pipe.

6. The telescopic water pipe structure as claimed in claim 1, wherein the upper seal cap has an internal space for communicating with the pipe hole of the external pipe and the first water passage, and an upper terminal of the upper seal cap has an upper hole passed by the internal pipe, and an internal pipe water stop ring is disposed between the upper hole and an external circumference of the internal pipe.

7. The telescopic water pipe structure as claimed in claim 1, wherein a limiting pipe is fastened to an inside of the upper seal cap relative to a lower portion of the upper hole, and a pipe hole of the limiting pipe is slightly greater than an external diameter of the internal pipe, an external diameter of the limiting pipe is smaller than an internal diameter of the pipe hole of the external pipe, and two sides of an upper section of the limiting pipe has symmetric window holes.

8. The telescopic water pipe structure as claimed in claim 1, wherein the main water passage and the secondary water passage are respectively extended from an upper end of the lower seal cap, and the secondary water passage is formed to a secondary water passage pipe, and the secondary water passage pipe is closely fit to the first water passage, and the main water passage is formed to a main water passage pipe, and the main water passage pipe is fit to the pipe hole of the external pipe, and a water stop ring I is disposed between an external portion of the secondary water passage pipe and an internal wall of the first water passage, and a water stop ring II is disposed between an external portion of the main water passage pipe and an internal wall of the pipe hole of the external pipe.

9. The telescopic water pipe structure as claimed in claim 1, wherein an internal axial direction of the lower seal cap has an axis cylinder, and a channel seal cap of the water passage control switch has an axial hole for accommodating the axis cylinder, and is incorporates with a screw.

10. The telescopic water pipe structure as claimed in claim 1, wherein the water passage control switch comprises a channel seal cap, a connecting pipe, and a rotary switch.

11. The telescopic water pipe structure as claimed in claim 10, wherein the channel seal cap is a cap body with an upward opening and having an axial hole, and a first channel, a second channel and a third channel are independently divided along a periphery of the axial hole, and the first through hole is disposed to a bottom of the first channel, and the second through hole is disposed to a bottom of the second channel, and the third through hole is disposed to a bottom of the third channel, and the extension groove is formed to the side of the third through hole.

12. The telescopic water pipe structure as claimed in claim 1, wherein the channel seal cap is assembled to the inside of the lower seal cap to form the sealing state, and a proper height space is preset between a top of the channel seal cap and a top inside the lower seal cap.

13. The telescopic water pipe structure as claimed in claim 10, wherein an inside of the connecting pipe comprises a transverse plate having a circular hole to form an upper pipe hole and a lower pipe hole, and a bottom of the channel seal cap has a limiting cylinder capable of fitting the upper pipe hole, and incorporates with a screw to lock into a predetermined central hole of the limiting cylinder via the circular hole from the lower pipe hole so that the channel seal cap is integrated with the connecting pipe, and a certain space is preset between a bottom of the channel seal cap and a top of the connecting pipe to dispose and limit the rotary switch.

14. The telescopic water pipe structure as claimed in claim 10, wherein an inside of the rotary switch has a partition for partitioning an upper accommodating chamber and a lower accommodating chamber, and the upper accommodating chamber is provided for accommodating a lower section of the lower seal cap, and the partition has a central circle hole for connecting the channel seal cap, and another side of the partition has a penetration hole, and an upper terminal of the partition has the interconnection groove, a limit recess, and the arc plane, and the limit recess is fitted with a water stop ring for surrounding circumferences of the interconnection groove and the penetration hole, and the water stop ring surrounds circumferences of the central circle hole, the interconnection groove and the penetration hole.

15. The telescopic water pipe structure as claimed in claim 1, wherein the second channel and the third channel are merged.

* * * * *